(12) United States Patent
Koike et al.

(10) Patent No.: US 8,879,400 B2
(45) Date of Patent: Nov. 4, 2014

(54) MOBILE COMMUNICATION SYSTEM, BASE STATION, CELL COVERAGE CONTROL METHOD

(75) Inventors: Hitoshi Koike, Yokohama (JP); Tohru Nakahara, Yokohama (JP); Koji Ogawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 13/608,006

(22) Filed: Sep. 10, 2012

(65) Prior Publication Data

US 2012/0327909 A1 Dec. 27, 2012

Related U.S. Application Data

(63) Continuation of application No. PCT/JP2010/001904, filed on Mar. 17, 2010.

(51) Int. Cl.
| | |
|---|---|
| *H04B 7/00* | (2006.01) |
| *H04W 24/08* | (2009.01) |
| *H04W 52/28* | (2009.01) |
| *H04W 52/24* | (2009.01) |
| *H04W 52/40* | (2009.01) |
| *H04W 36/00* | (2009.01) |
| *H04W 16/28* | (2009.01) |

(52) U.S. Cl.
CPC ............ *H04W 24/08* (2013.01); *H04W 52/247* (2013.01); *H04W 52/245* (2013.01); *H04W 52/40* (2013.01); *H04W 36/0088* (2013.01); *H04W 52/283* (2013.01); *H04W 16/28* (2013.01)
USPC ............................ 370/241; 370/328; 455/423

(58) Field of Classification Search
None
See application file for complete search history.

(56) References Cited

U.S. PATENT DOCUMENTS

| | | | | |
|---|---|---|---|---|
| 2002/0082036 | A1* | 6/2002 | Ida et al. ..................... | 455/522 |
| 2003/0003918 | A1* | 1/2003 | Proctor et al. ............... | 455/446 |
| 2006/0121855 | A1* | 6/2006 | Dillon .......................... | 455/69 |
| 2008/0096578 | A1* | 4/2008 | Lin et al. .................. | 455/456.1 |
| 2010/0105377 | A1 | 4/2010 | Iwamura et al. | |

FOREIGN PATENT DOCUMENTS

| | | |
|---|---|---|
| EP | 2 117 135 | 11/2009 |
| JP | 2003-8498 | 1/2003 |
| JP | 2003-204296 | 7/2003 |
| JP | 2008-172380 | 7/2008 |
| JP | 2009-81486 | 4/2009 |

OTHER PUBLICATIONS

Korean Notice of Preliminary Rejection dated Nov. 27, 2013, from corresponding Korean Application No. 10-2012-7024267.

(Continued)

*Primary Examiner* — Kevin C Harper
(74) *Attorney, Agent, or Firm* — Katten Muchin Rosenman LLP

(57) ABSTRACT

There is provided a mobile communication system, a base station, and a method of controlling cell coverage that is capable of operating a mobile communication system such that the cell coverage is maintained approximately and timely at a target level without requiring much labor. In this mobile communication system, a mobile station reports to the base station the position information of the mobile station and the value of reception power of reference signal from the base station. The base station obtains the measured cell coverage as a result of measurement of cell coverage based on the position information and the value of reception power from the mobile stations, and controls at least one of plural parameters including transmission power to the mobile stations, tilt angle of antenna, etc., so as to minimize deviation of the measured cell coverage from the target cell coverage.

18 Claims, 18 Drawing Sheets

(56) References Cited

OTHER PUBLICATIONS

3rd Generation Partnership Project; Technical Specification Group Radio Access Network; Study on Minimization of drive-tests in Next Generation Networks; (Release 9), 3 GPP TR 36.805 V9.0.0, Dec. 2009.

International Search Report dated Jun. 15, 2010, from corresponding Japanese Application No. PCT/JP2010/001904.

* cited by examiner

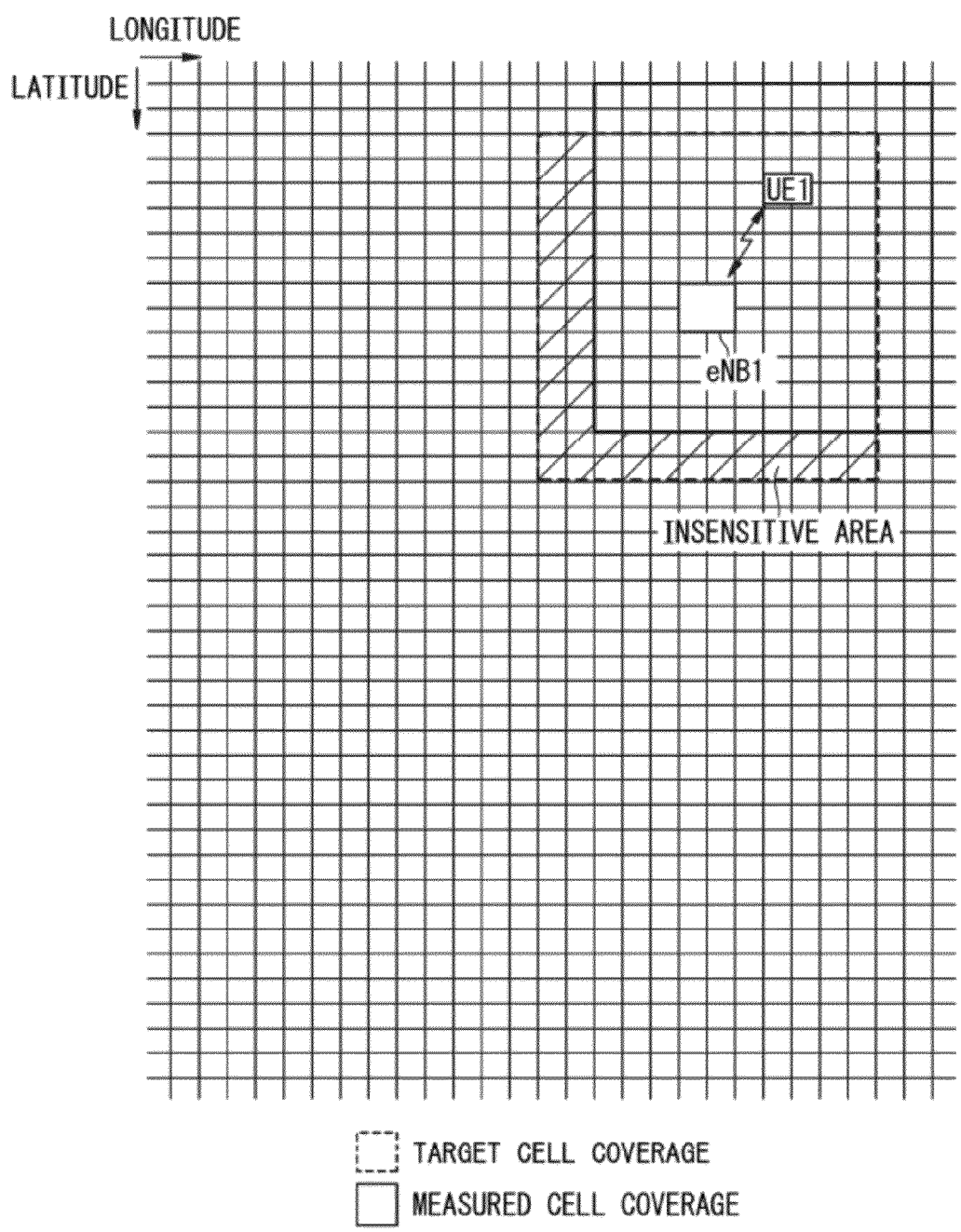

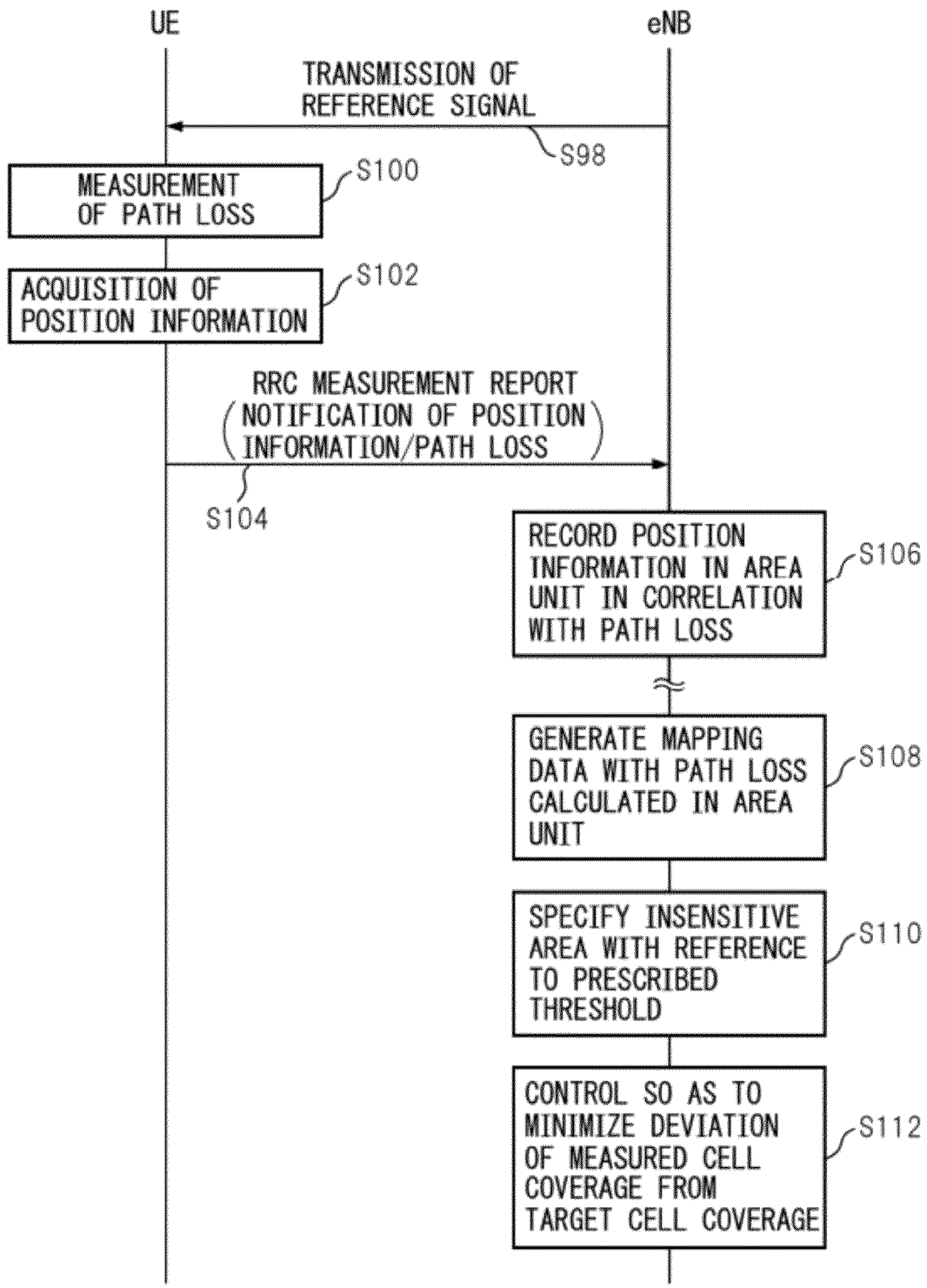

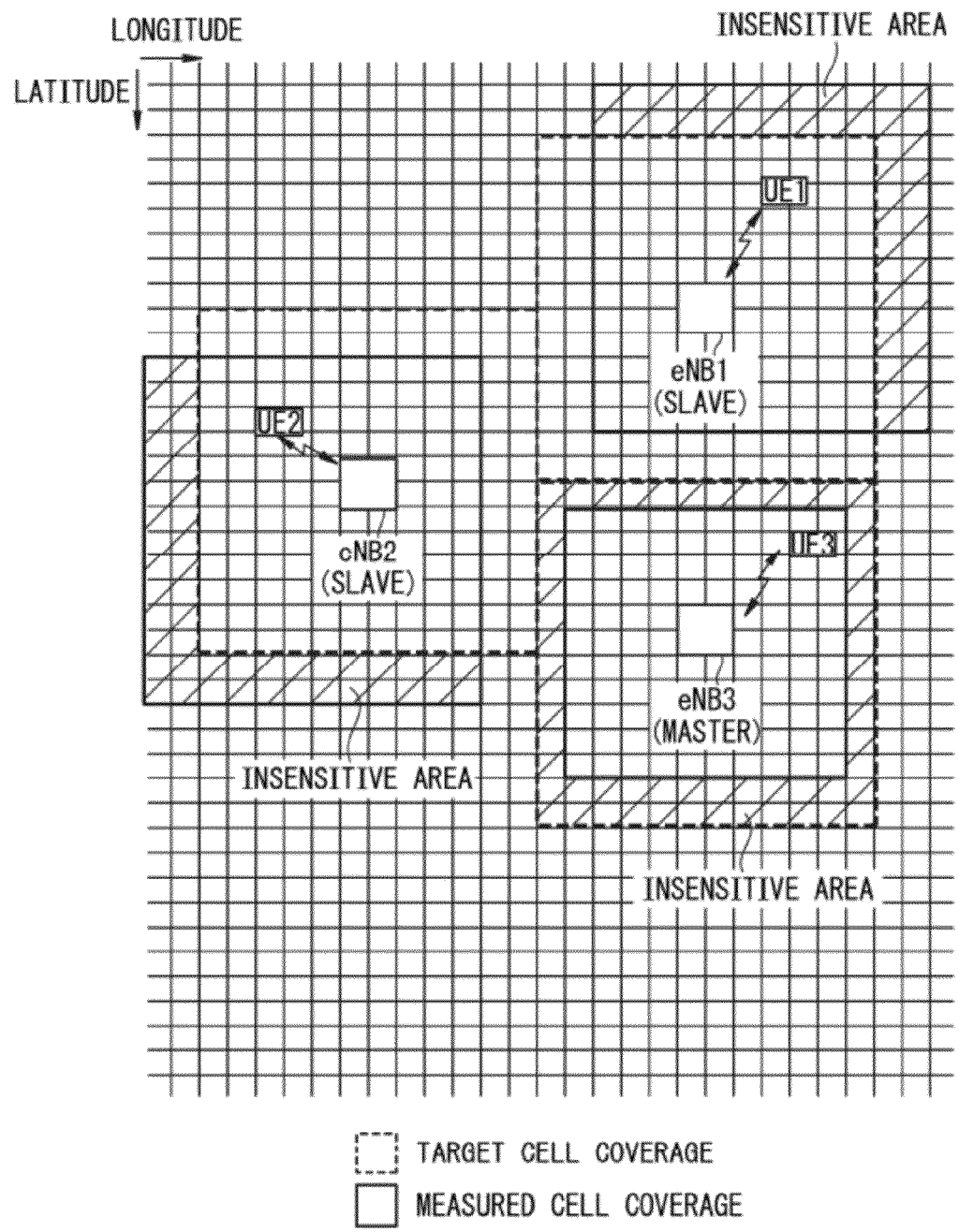

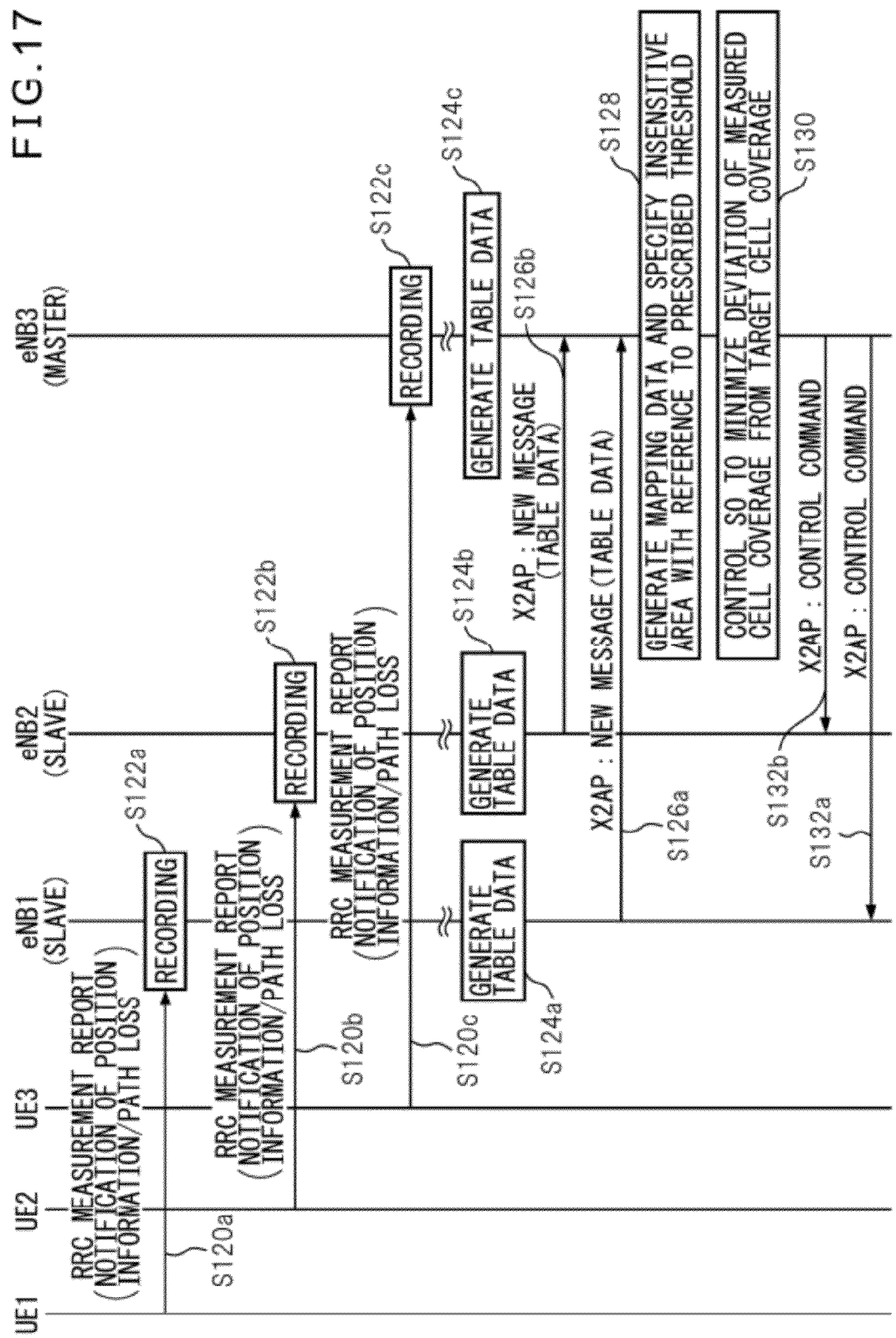

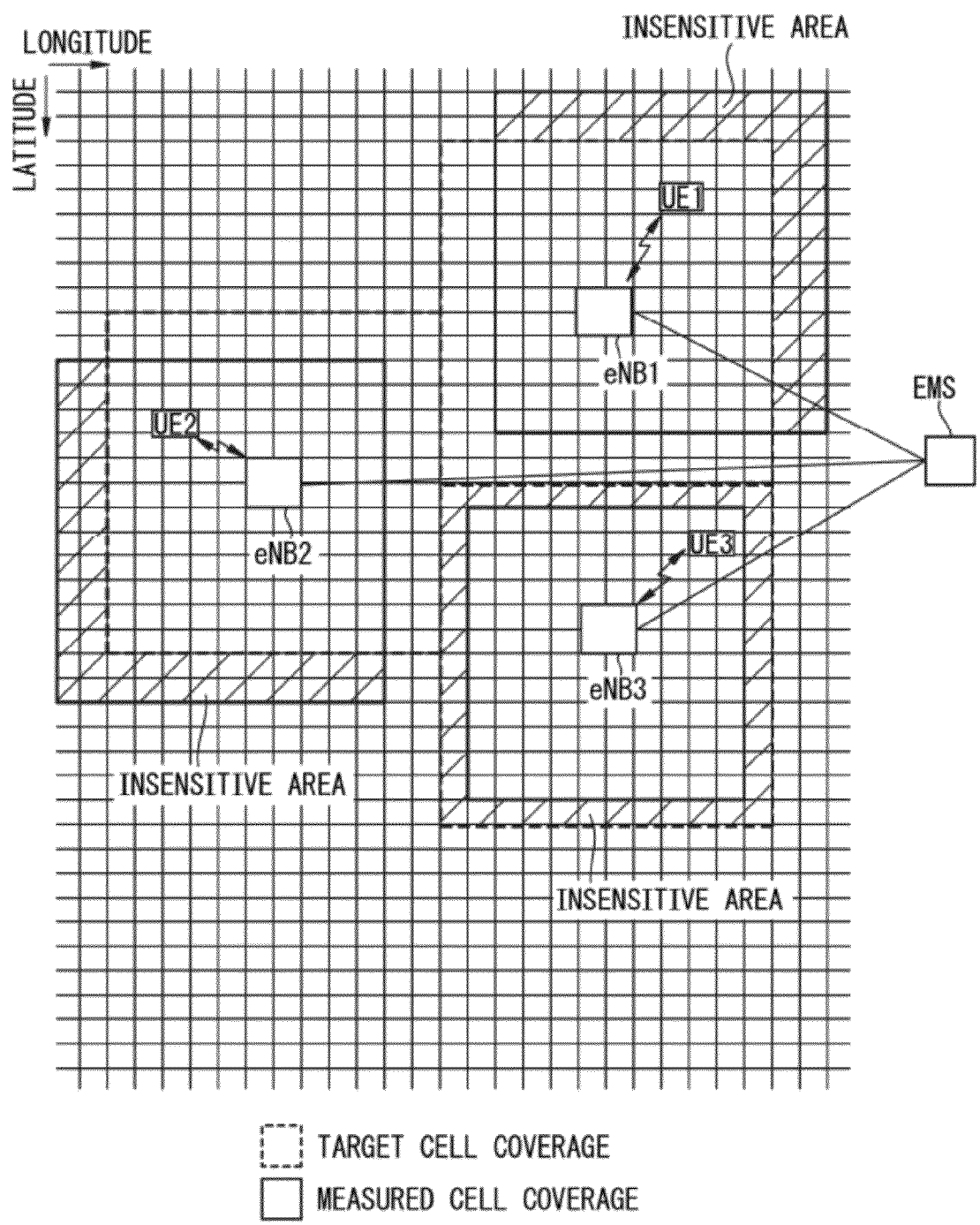

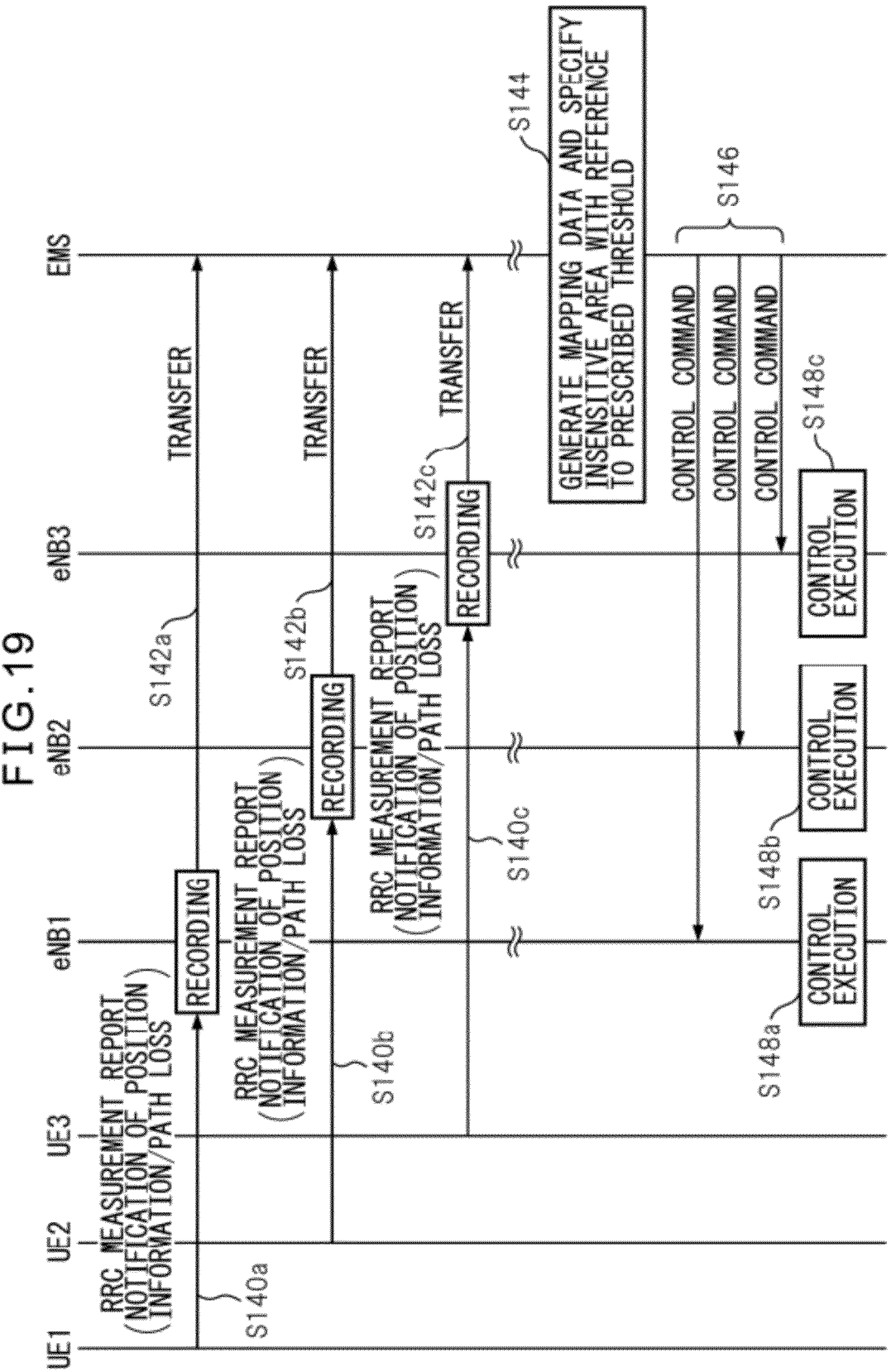

MOBILE COMMUNICATION SYSTEM, BASE STATION, CELL COVERAGE CONTROL METHOD

CROSS-REFERENCE TO RELATED APPLICATIONS

This application is a continuation application based on International application No. PCT/JP2010/001904, filed on Mar. 17, 2010, the entire contents of which are incorporated herein by reference.

FIELD

The present invention relates to a technology for controlling cell coverage of a base station in a mobile communication system.

BACKGROUND

Conventionally, in a mobile communication system, a telecommunication carrier providing the service determines in advance the cell coverage, i.e., the service area of each radio base station (herein after simply referred to as "base station"), and sets various parameters for a base station so as to realize such cell coverage. Parameters include, for example, transmission power of the base station for each cell, height of an antenna, antenna directivity, tilt angle, etc. After these parameters are set and system operation is started, a change in system operational conditions or a change in the radio communication environment (for example, change in path loss due to new building or the like) may occur, and initially planned cell coverage cannot be realized. Therefore, in order to maintain quality of communication service to the user in the system, the telecommunication carrier measures cell coverage of base stations by measuring reception power of radio waves from base stations using a radio wave measurement apparatus, or the like. The cell coverage determined by this measurement (measured cell coverage) is compared with initially planned cell coverage (target cell coverage) and the above-mentioned parameters are changed as necessary.

For example, a method has been conventionally known for setting the above-mentioned parameters as described below. With this conventional method of setting the above-mentioned parameters, for all cells in the area specified that have trouble in the area to be optimized, parameters for each cell are calculated to improve reception quality in the area. Calculation of parameters is carried out based on the station information retrieved from a station information record database, and position coordinates of each measurement point in the relevant area recorded in a measurement data record database.

Related art is disclosed in Japanese Laid-open Patent Publication No. 2009-81486.

SUMMARY

There is provided a mobile communication system comprising base stations and mobile stations. In this mobile communication system, a mobile station reports to the base station the position information of the mobile station and the value of reception power of reference signal from a base station. The base station obtains the measured cell coverage as measurement result of cell coverage based on the position information and the value of reception power reported by mobile stations, and the base station controls at least one of plural parameters including transmission power to mobile stations, tilt angle of antenna, etc., in order to minimize the deviation of measured cell coverage from the target cell coverage.

There is provided a base station including, a transmission unit that transmits a reference signal to mobile stations, a reception unit that acquires position information of a mobile station and the value of reception power of the reference signal received by the mobile station, a cell coverage measurement unit that obtains the measured cell coverage as the result of measuring cell coverage based on position information and the value of reception power reported from mobile station, and a cell coverage control unit that controls at least one of plural parameters including transmission power to mobile stations, tilt angle of antenna, etc., in order to minimize deviation of the measured cell coverage from the target cell coverage.

There is provided a method of controlling cell coverage for a base station to control its cell coverage in a mobile communication system including base stations and mobile stations, including reporting to the base station, by the mobile station, of the position information of the mobile station and the value of reception power from the base station, obtaining by the base station of the measured cell coverage as the result of measurement of cell coverage based on position information and the value of reception power from the mobile stations, and controlling by the base station of at least one of plural parameters including the transmission power to the mobile stations, tilt angle of antenna, in order to minimize the deviation of the measured cell coverage from the target cell coverage.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a view illustrating the outline of cell coverage control performed in the fourth embodiment.

FIG. 15 is a flow chart depicting the processing performed between eNB and UE in accordance with the method of controlling cell coverage according to the fourth embodiment.

FIG. 16 is a view illustrating the outline of cell coverage control performed in the fifth embodiment.

FIG. 17 is a flow chart depicting the processing performed between each eNB and each UE in accordance with the method of controlling cell coverage according to the fifth embodiment.

FIG. 18 is a view illustrating the outline of cell coverage control performed in the sixth embodiment.

FIG. 19 is a flow chart depicting the processing performed between each eNB, each UE and EMS in accordance with the method of controlling cell coverage according to the sixth embodiment.

DESCRIPTION OF EMBODIMENTS

Figure 1:
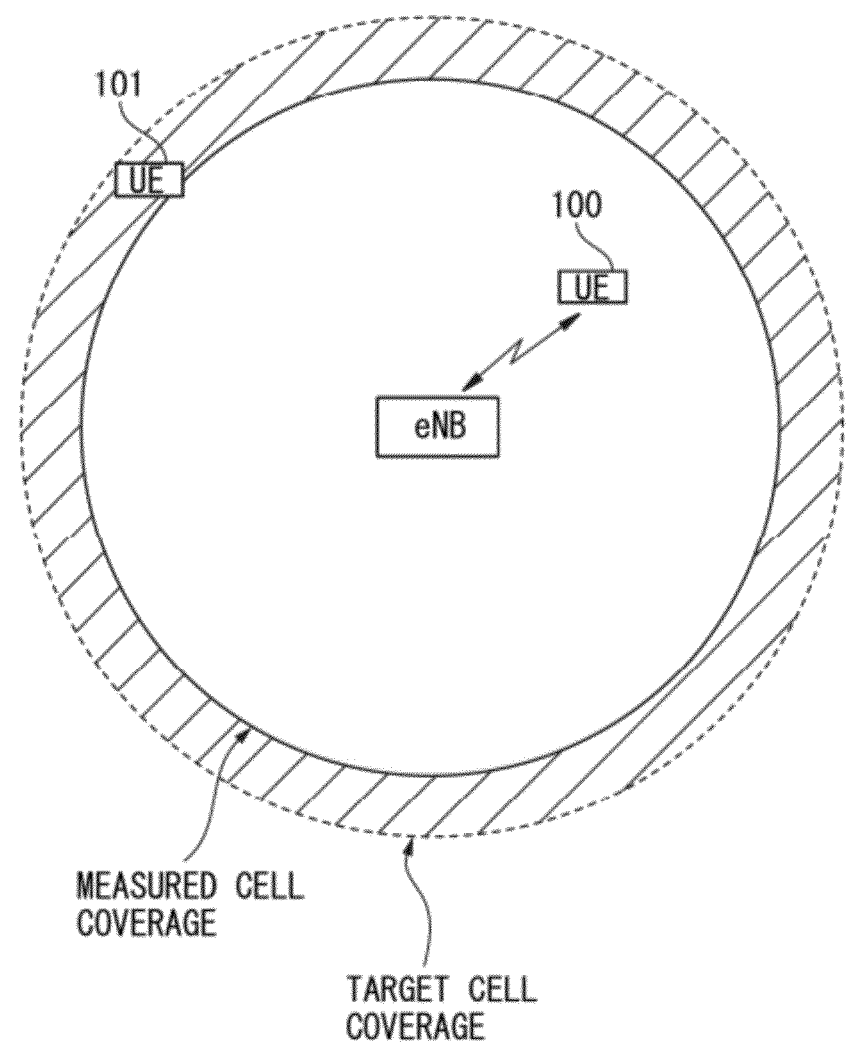
FIG. 1 is a view depicting an example of cell state before implementing the method of controlling cell coverage according to the first embodiment.

Plural embodiments of the mobile communication system, base station and method of controlling cell coverage according to the present invention will be described below. The mobile communication system in each embodiment is a cellular system, and includes a base station allotted to each cell, and mobile stations serviced by the base station in radio communication. In the following description and appended drawings, the cell coverage as indication of the radio communication service area of a base station to mobile stations is denoted by a circle or a rectangle for easy representation and understanding. However, it will be appreciated by those skilled in the art after reading this specification that the method of controlling cell coverage according to the present embodiment is applicable to cell coverage presupposing any form of region. In the description that follows, a base station is abbreviated as eNB (evolved Node B) and a mobile station is abbreviated as UE (User Equipment).

(1) First Embodiment

A mobile communication system according to a first embodiment will be described below. In this mobile communication system (hereinafter for convenience referred to simply as "system"), a target service area of eNB for mobile stations, i.e., target cell coverage, is defined in advance. In operating the system, parameters are set for eNB initially so as to obtain the target cell coverage. Parameters include, for example, transmission power of eNB to each UE, height of antenna provided in eNB, direction of the antenna, and tilt angle, etc.

In eNB of this embodiment, control system (not depicted) for controlling the height of antenna, direction of antenna and tilt angle is provided. This control system includes actuators, etc., for adjusting the height of antenna, direction of antenna and tilt angle of antenna, etc., based on control command.

The eNB of the present embodiment acquires, from each UE, the information on the position of each UE (hereinafter referred to as "position information"). Also, the eNB of the present embodiment transmits a reference signal such as pilot signal to each UE at a prescribed power level. Each UE measures the value of reception power of the reference signal and reports the result to eNB. eNB measures the cell coverage based on the value of reception power reported by each UE. Various methods can be employed for measurement of cell coverage based on the reception power value.

For example, the cell coverage can be measured based on information on different positions (two positions) of a specific UE in the cell and the reception power values of the UE at the two positions. If position of two points and variation of the reception power value at the two positions are known, trigonometry can be used to calculate the cell edge. Thus, cell coverage can be measured.

Since the value of transmission power of the reference signal to UE is known, eNB can measure the signal decay (sometimes called as "path loss") of signal between eNB and UE based on value of the transmission power and value of the reception power reported from UE. Also, UE can measure path loss based on value of the reception power of the reference signal if value of the transmission power of the reference signal from eNB to UE is known or notified by eNB. When this signal decay is correlated with the position information of UE, cell coverage can be measured in prescribed region unit based on a prescribed threshold of signal decay for performing radio communication between eNB and UE. With this method of cell coverage measurement, not only the cell edge, but also a local insensitive area in the cell can be specified.

In the description that follows, the cell coverage measured is referred to as measured cell coverage. This measured cell coverage is compared with the target cell coverage of the mobile communication system (for example, target cell coverage that has been set at the start of the system operation). eNB controls at least one of above-described plural parameters so as to minimize the deviation of the measured cell coverage from the target cell coverage.

Figure 2:
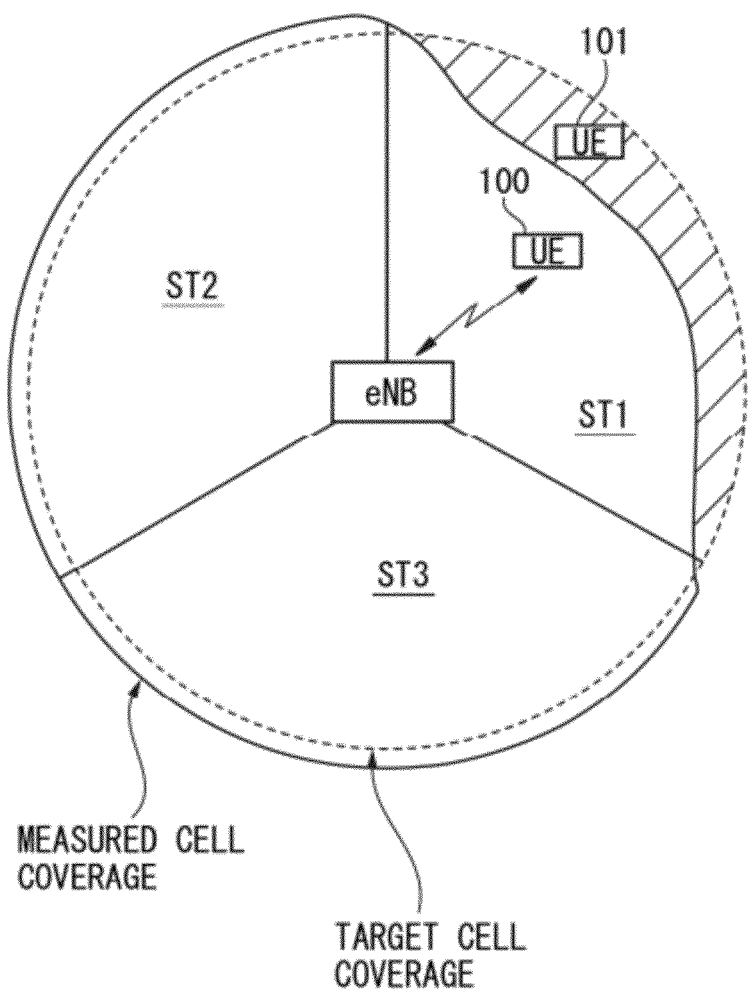
FIG. 2 is a view depicting another example of cell state before implementing the method of controlling cell coverage according to the first embodiment.

FIGS. 1 and 2 depict examples of a state in which the measured cell coverage deviates from the target cell coverage (a state before implementation of the method of controlling cell coverage according to the present embodiment). In FIG. 1, the measured cell coverage is narrower than the target cell coverage in all direction, and UE 100 as an example can communicate with eNB, whereas UE 101 cannot communicate with eNB. In FIG. 2, the measured cell coverage is narrower as compared to the target cell coverage only in a specific direction, and UE 100 as an example can communicate with eNB, whereas UE 101 cannot communicate with eNB.

eNB of the present embodiment compares the measured cell coverage with the target cell coverage, and if, as shown in FIG. 1, it is found that the measured cell coverage is narrower than the target cell coverage in all direction, eNB increases transmission power in all direction. As a result, deviation of the measured cell coverage from the target cell coverage is reduced. On the other hand, eNB of the present embodiment compares the measured cell coverage with the target cell coverage, and if, as shown in FIG. 2, it is found that the measured cell coverage is narrower than the target cell coverage in a specific direction, eNB increases transmission power, for example, in a specific direction. For example, if the cell is constructed from 3 sectors, eNB increases transmission power in the direction corresponding to a specific sector (in FIG. 2, the sector ST1). eNB may controls tilt angle of the antenna for a specific sector. As a result, deviation of the measured cell coverage from the target cell coverage is reduced.

Figure 3:
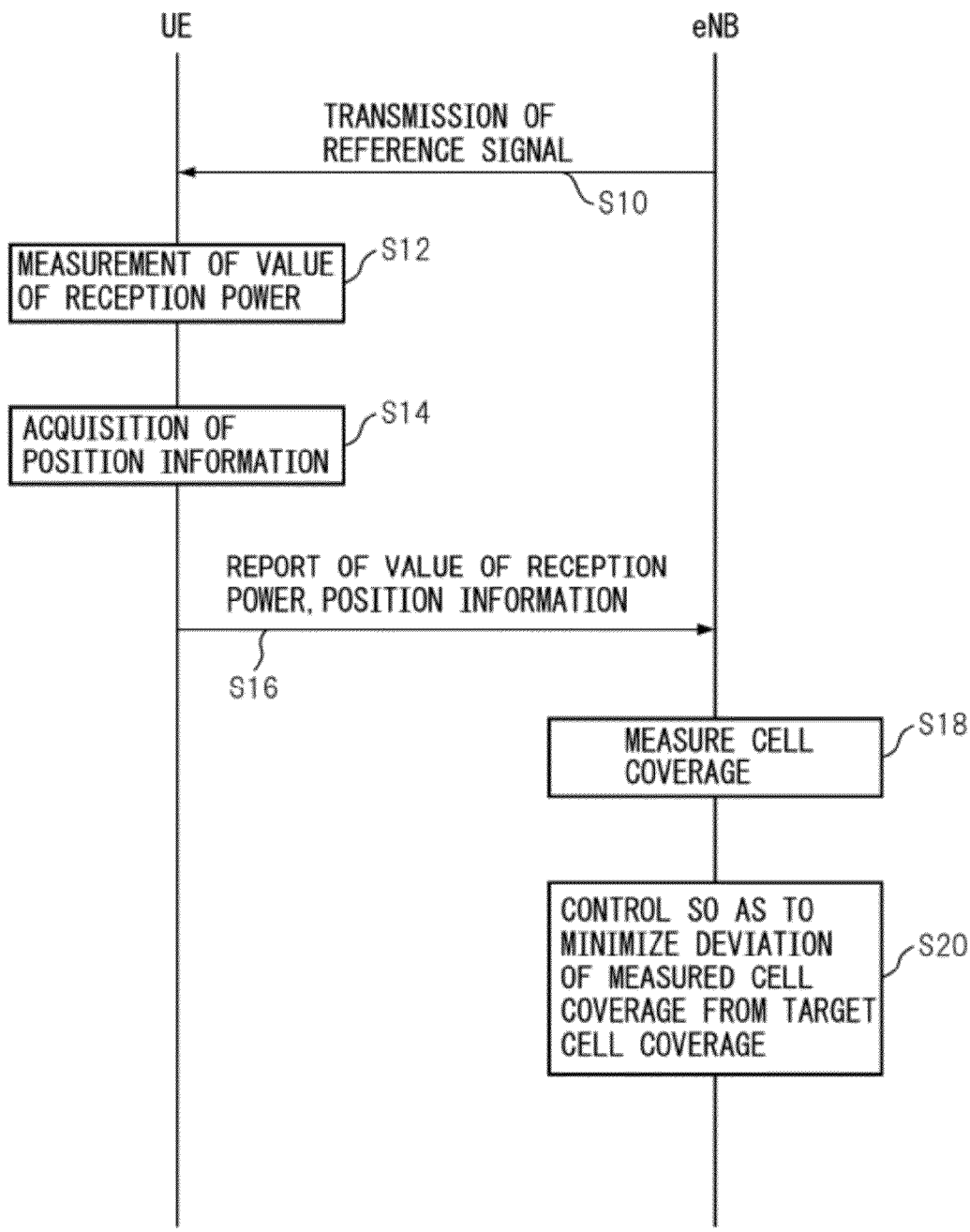
FIG. 3 is a flow chart illustrating the method of controlling cell coverage according to the first embodiment.

The method of controlling cell coverage according to the present embodiment will be described below with reference to FIG. 3. Referring to FIG. 3, first, eNB transmits a reference signal such as pilot signal to each UE at a prescribed power level (step S10). UE receives the reference signal transmitted at step S10, and measures the value of reception power (step S12). Further, UE acquires position information of UE itself using a prescribed position acquisition means such as GPS (Global Positioning System), for example (step S14). Value of reception power and position information acquired at steps S12 and S14 are then reported to eNB (step S16).

In eNB, upon reception of report from each UE at step S16, eNB measures cell coverage using the above-described method of cell coverage measurement to obtain the measured cell coverage (step S18). At this time, depending on the cell coverage measurement method, eNB can acquire plural samples of the value of reception power and position information from the same UE at different positions. Next, eNB compares the measured cell coverage obtained at step S18 with the target cell coverage defined in advance, and controls at least one of plural parameters including transmission power, height of the antenna, antenna direction and tilt angle, etc., in order to minimize the deviation between the two cell coverages. The parameters to be controlled are preferably selected so as to minimize the deviation of the measured cell coverage from the target cell coverage. Processing in the above-described steps S10 to S20 is performed sequentially. Therefore, even if the measured cell coverage deviates from the target cell coverage due to change in radio environment, above-described parameters can be fed back in eNB in short time period so as to take appropriate values.

As has been described above, in accordance with the mobile communication system, the method of controlling cell coverage, eNB transmits reference signal to UE, and obtains the measured cell coverage based on the position information and the value of reception power reported from each UE. Then, eNB controls parameters concerned with UE so as to minimize the deviation of the measured cell coverage from the target cell coverage. At this time, a special radio wave measuring apparatus needs not be used to measure the power. Therefore, without much labor, the cell coverage can be maintained timely and approximately at target level.

(2) Second Embodiment

The mobile communication system according to the second embodiment will be described below. In the mobile communication system of the second embodiment, measurement of cell coverage is performed in the timing of inter-eNB handover for UE. In the present embodiment, based on the position information and the value of reception power from UE, the distance from eNB to the cell edge (a first distance from eNB as an index of cell coverage) is calculated. The measured cell coverage in the shape of a circle with eNB as the center and this distance from eNB as the radius is presupposed. Actually, cell coverage is not accurately a circle, but with such presupposition, control of power (to be described later) can be simplified.

(2-1) Handover Between eNBs

Figure 4:
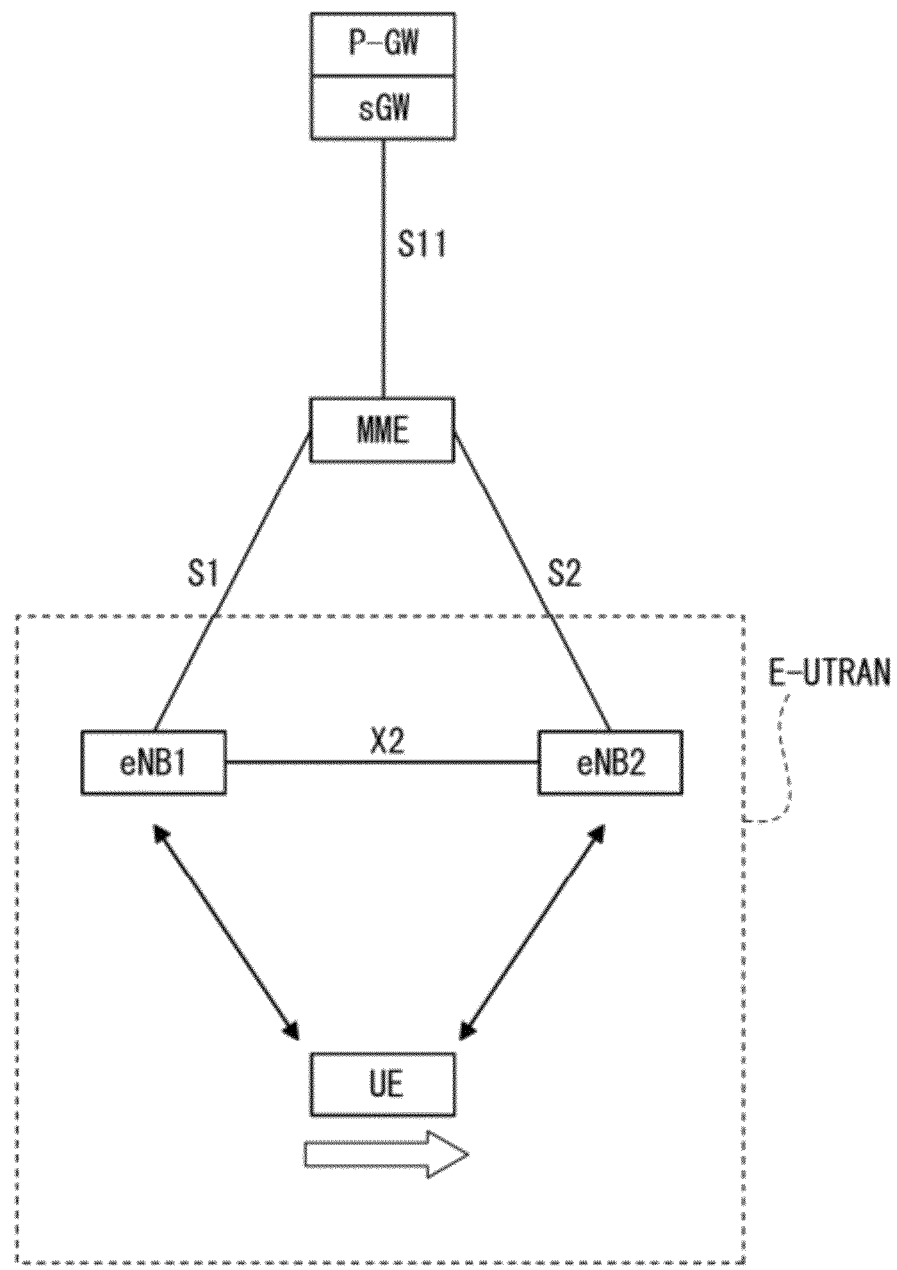
FIG. 4 is a schematic view depicting the construction of a radio network according to the second embodiment.

The mobile communication system according to the present embodiment belongs to, for example, to E-UTRAN (Evolved Universal Terrestrial Radio Access Network) of LTE (Long Term Evolution) that is the high speed mobile communication standard of the next generation. In LTE, each eNB is directly connected to the core network. FIG. 4 is a schematic view depicting the construction of LTE. In the drawing, eNB1 and eNB2 are connected via X2 interface. Each eNB is connected to upper MME (Mobility Management Entity) via S1 interface. MME is connected to upper sGW (serving Gateway), P-GW (PDN (Packet Data Network) Gateway) via S11 interface.

In FIG. 4, the processing for inter-eNB handover from eNB1 to eNB2 is schematically as follows. Here, eNB1 is a source eNB and eNB2 is a target eNB. Upon receiving the measurement report (RRC MEASUREMENT REPORT) on the radio communication quality from UE, eNB1 decides to execute the handover. Via X2 interface, eNB1 sends a handover request message (HANDOVER REQUEST) to eNB2, and eNB2 sends a handover confirmation message (HANDOVER REQUEST ACKNOWLEDGE) to eNB1 as response to the request. When message exchange between eNBs is completed, eNB1 transmits a handover instruction message (RRC CONNECTION RECONFIGURATION) to UE. Upon receiving the handover instruction message, when prescribed processing with eNB2 as the target eNB is completed, UE transmits a handover completion message (RRC CONNECTION RECONFIGURATION COMPLETE) to eNB2. eNB2 as the target eNB accesses to upper MME and requests switching of downlink path. In response to this message, prescribed processing is performed between MME and upper sGW, P-GW, and switching of the downlink path is confirmed between them.

Figure 5:
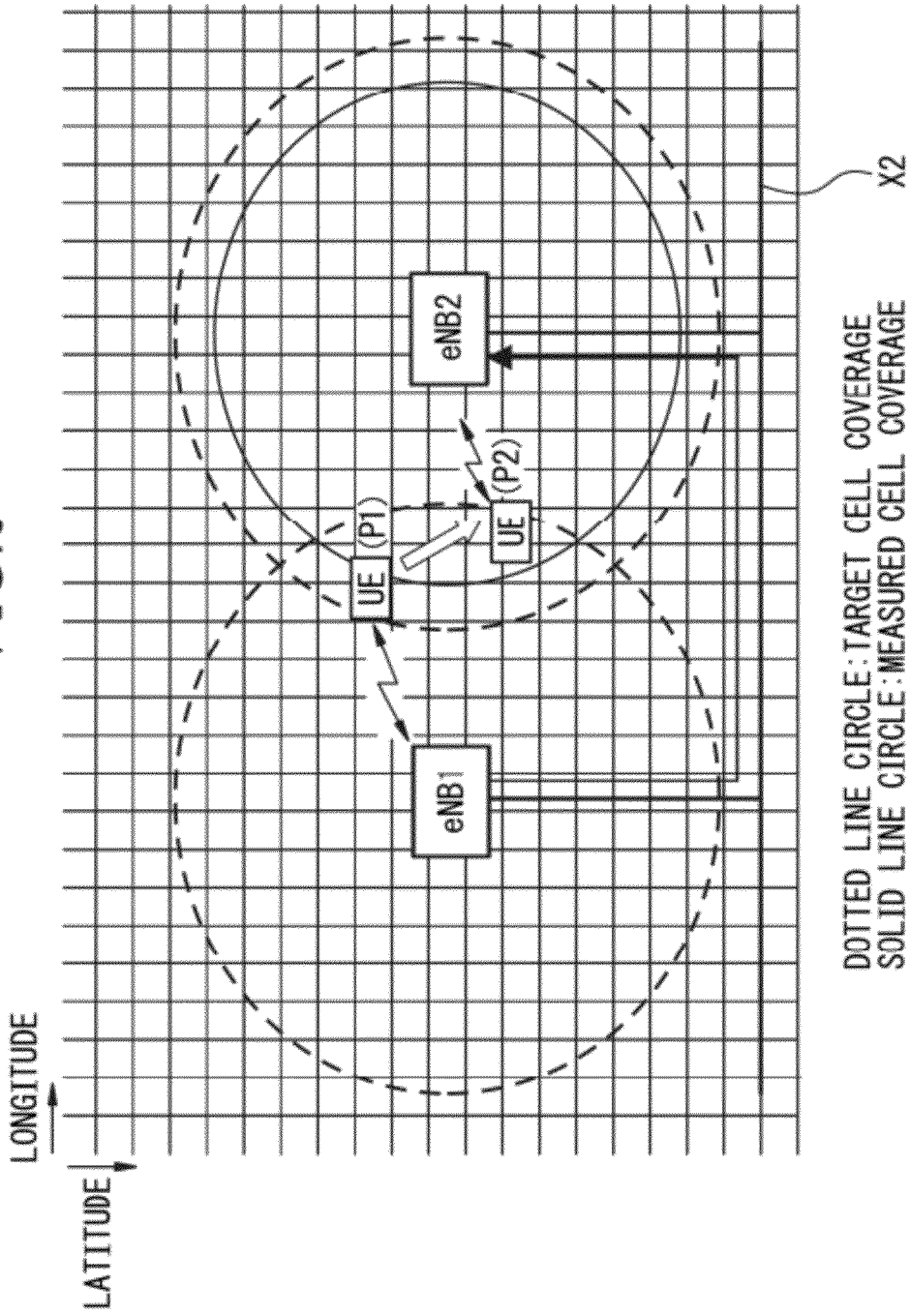
FIG. 5 is a view depicting the state of handover between eNBs for UE according to the second embodiment.

FIG. 5 is a view depicting the state of UE being handed over from eNB1 to eNB2. In FIG. 5, it is depicted that UE is situated at position P1 at the start of handover and at position P2 at the completion of handover. At this time, the cell coverage of eNB2 as the target eNB is measured.

(2-2) Construction of UE, eNB

Figure 6:
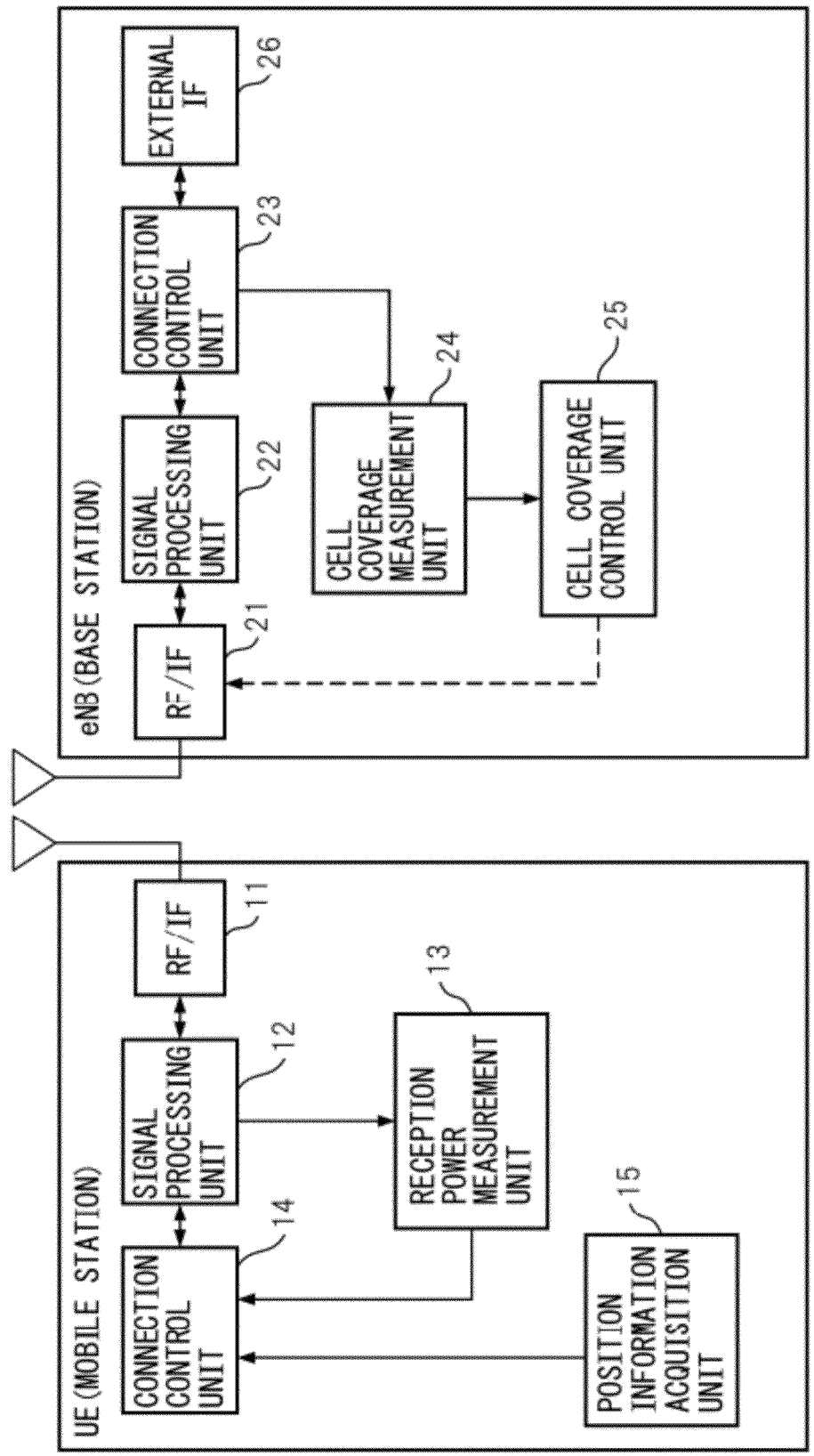
FIG. 6 is a block diagram depicting the construction of UE and eNB according to the second embodiment.

The construction of UE and eNB in the mobile communication system of the present embodiment will be described below with reference to FIG. 6. As depicted in FIG. 6, UE in the present embodiment includes a radio interface unit (RF/IF) 11, a signal processing unit 12, a reception power measurement unit 13, a connection control unit 14, and a position information acquisition unit 15.

In IE as depicted in FIG. 6, the radio interface unit 11 includes an antenna for establishing radio communication with eNB, a receiver and a transmitter. The receiver transforms (down-converts) the radio signal received via the antenna into digital base band signal (hereinafter referred to as reception signal). The transmitter up-converts the transmission signal generated by the signal processing unit 12 from the base band frequency to radio frequency. The signal processing unit 12 separates the reception signal into data signal, control signal, and reference signal (for example, pilot signal), and generates transmission signal by multiplexing data signal, control signal, and reference signal. The reception power measurement unit 13 measures the value of reception power of the reference signal in the reception signal separated by the signal processing unit 12, and notifies this value of reception power to the connection control unit 14. The value of reception power measured by the reception power measurement unit 13 is fed back to eNB, and is utilized by eNB for measurement of cell coverage.

The position information acquisition unit 15 acquires position information of UE and notifies it to the connection control unit 14. Various methods are possible for acquiring position information in the position information acquisition unit 15. For example, the position information acquisition unit 15 can use GPS position measurement method to receive GPS signal from GPS (Global Positioning System) satellite (not depicted) and to sequentially calculate position data of UE. This GPS positioning method is a method of calculating a position in which signals from four or more GPS satellites are received and their arrival times are compared based on a trigonometric principle in order to calculate the position. The position information acquisition unit 15 may use various methods other than GPS positioning method to acquire position information. For example, delay time of synchronous signal received from 3 or more eNBs can be used to calculate position based on trigonometric principle, although precision is lower than GPS positioning method.

The connection control unit 14 executes processing associated with handover processing between eNBs. For example, such processing includes measurement of radio communication quality for measurement report in the handover processing (REC MEASUREMENT REPORT), prescribed signal processing and message generation and analysis associated with handover performed between eNBs. Here, the connection control unit 14 includes the value of reception power measured by the reception power measurement unit 13 and the position information acquired by the position information acquisition unit 15 into specific handover message to eNB.

As depicted in FIG. 6, eNB of the present embodiment includes a radio interface unit (RF/IF) 21 as a transmission unit and a reception unit, a signal processing unit 22, a connection control unit 23, a cell coverage measurement unit 24, a cell coverage control unit 25, and an external interface unit (external IF) 26.

In eNB depicted in FIG. 6, the radio interface 21 includes an antenna for establishing radio communication with UE, a receiver and a transmitter. The receiver transforms (down-converts) radio signal received via the antenna (hereinafter referred to as reception signal) to digital base band signal. The transmitter up-converts the transmission signal generated by the signal processing unit 22 from base band frequency to radio frequency. The signal processing unit 22 separates the reception signal into data signal, control signal and reference signal (for example, pilot signal), and generates transmission signal by multiplexing the data signal, control signal and reference signal.

The connection control unit 23 executes processing associated with handover processing between eNBs. For example, such processing includes generation and analysis of prescribed message associated with the handover performed to and from UE, the target eNB (if eNB is the source eNB) or the source eNB (if eNB is the target eNB). The connection control unit 23 is constructed to permit connection to upper entity (for example, MME) via external interface 26. Naturally, the handover processing in the connection control unit 23 is managed by each UE.

The cell coverage measurement unit 24 measures the radius of cell coverage based on the position information of UE and the value of reception power of reference signal in UE. Measurement of the radius of cell coverage is performed by calculation from the value of reception power reported to eNB at the start of the handover and the value of reception power reported to eNB at the completion of the handover and the distance between the position of UE at the start of the handover and the position of UE at the completion of the handover by the method to be described later. Since, by measuring the radius of cell coverage, the entire region of cell coverage can be largely estimated, measurement of the radius of cell coverage is equivalent to measurement of cell coverage.

The cell coverage control unit 25 controls the transmission power of the transmitter of the radio interface unit 21 so as to minimize the deviation of the radius of cell coverage obtained by the cell coverage unit 24 (first distance) from the radius of target cell coverage (prescribed target distance). Thus, if the radius of cell coverage obtained by the cell coverage measurement unit 24 is smaller than that of target cell coverage, the cell coverage control unit 25 increases the amplification factor of the transmitter to increase the transmission power. On the contrary, if the radius of cell coverage obtained by the cell coverage measurement unit 24 is larger than that of target cell coverage, it decreases the amplification factor of the transmitter to decrease the transmission power.

(2-3) Method of Calculating Radius of Cell Coverage

Figure 7:
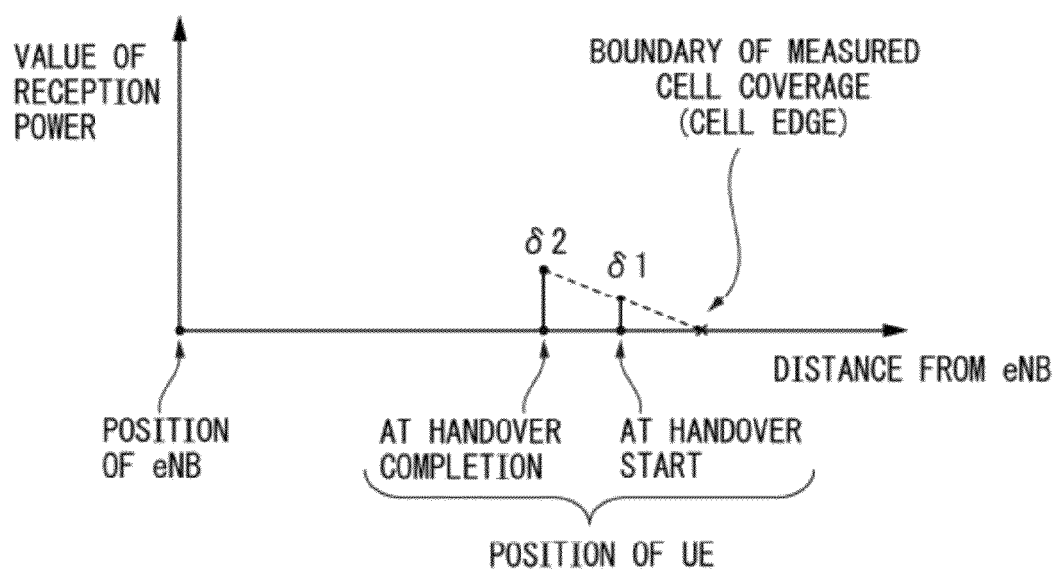
FIG. 7 is a view depicting the relation between the distance of UE from the target eNB for handover and the value of reception power reported by the UE in the second embodiment.

Method of calculating radius of cell coverage in eNB of the present embodiment will be illustrated below with reference to FIG. 7. FIG. 7 is a view depicting the relation of the distance of UE from the target eNB of the handover and the value of reception power reported by the UE. Calculation of the radius of cell coverage is carried out by the cell coverage measurement unit 24 of eNB. eNB receives, from UE as the object of handover by other nearby eNB, report of the position information and the value of reception power in the timing of handover start and handover completion. Since position in the timing of handover start and in the timing of handover completion is known in eNB, position of the cell edge can be measured by the trigonometric principle. The radius of cell coverage is equal to the distance from eNB to cell edge.

In this calculation method, the distance between two points, that is, between the position of UE at the start of handover and the position of UE at the completion of handover, is preferably calculated accurately using Hubeny's distance formula. Let latitude and longitude of the position of UE at the start of handover (first position) be $\lambda 1$, $\phi 1$, and let latitude and longitude of the position of UE at the completion of handover (second position) be $\lambda 2$, $\theta 2$, respectively, and let mean latitude between two point be P, and let latitude difference and longitude difference between two points be $d\lambda$, $d\phi$, respectively, and let radius of curvature of meridian be M, and let radius of curvature of prime vertical be N, then in accordance with Hubeny's formula, the distance D between the two points can be expressed by Eq. 1 below.

$$D = \text{sqrt}((M*d\lambda)*(M*d\lambda) + (N*\cos(P)*d\phi)*(N*\cos(P)*d\phi)) \quad \text{(Eq. 1)}$$

where
$P = ((\lambda 1 + \lambda 2)*\pi/180)/2$
$d\lambda = (\lambda 1 - \lambda 2)*\pi/180$
$d\phi = (\phi 1 - \phi 2)*\pi/180$
$M = 6334834/\text{sqrt}((1 - 0.006674*\sin(P)*\sin(P))^3$
$N = 6377397/\text{sqrt}((1 - 0.006674*\sin(P)*\sin(P))$ Let the distance between these two points be D, and let the value of reception power at the start of handover (first reception power value) be $\delta 1$, and let the value of reception power at the completion of handover (second reception power value) be $\delta 2$, then the cell coverage measurement unit 24 calculates signal attenuation factor C of UE in accordance with following Eq. 2.

$$C = (\delta 2 - \delta 1)/D \quad \text{(Eq. 2)}$$

Let distance from the target eNB of handover to UE at the start of handover be D2, and let radius of the measured cell coverage be SR1, then based on the trigonometric principle, $\delta 1/(SR1 - D2) = C$ holds. Therefore, radius of the measured cell coverage can be calculated using Eq. 3 depicted below. D2 used in Eq. 3 can be calculated using the above-described Hubeny's formula.

$$SR1 = D2 + \delta 1/C \quad \text{(Eq. 3)}$$

(2-4) Method of Controlling Cell Coverage

Figure 8:
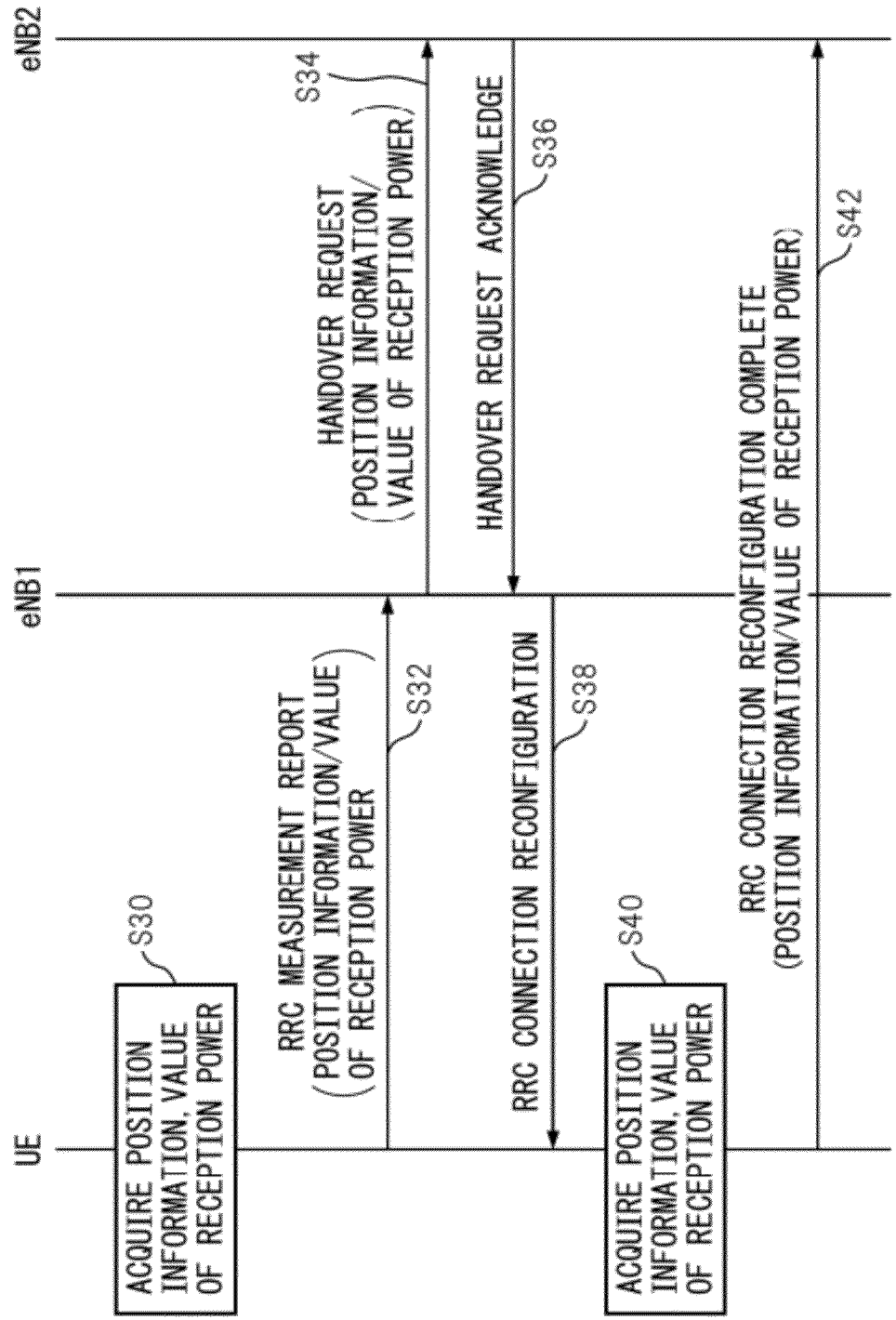
FIG. 8 is a flow chart illustrating the processing between eNB and UE according to the second embodiment.

The method of controlling cell coverage executed in the mobile communication system of the present embodiment will be described below. First, the processing executed between eNB of the present embodiment and UE in the timing of handover will be described with reference to FIG. 8. FIG. 8 is a flow chart depicting the processing between eNB of the present embodiment and UE. In FIG. 8, when handover is executed between eNB1 to eNB2 (see FIG. 5), processing will be as follows. In UE, prior to the report of measured radio communication quality (RRC MEASUREMENT REPORT), the position information and the value of reception power is acquired (step S30). In the report of measured radio communication quality (RRC MEASUREMENT REPORT) from UE to eNB1, the position information and the value of reception power acquired at step S30 is included (step S32). When, in response to the measurement report of radio communication quality, eNB1 decides to execute handover, it transmits a handover request message (HANDOVER REQUEST) to eNB2 (step S34). At this time, the position information and the value of reception power acquired from UE are included in this handover request message. With the above-described processing, eNB2 that is the object of radius measurement of cell coverage can obtain the position information and the value of reception power at the start of handover.

In response to the handover request message at step S34, eNB2 transmits handover confirmation message (HANDOVER REQUEST ACKNOWLEDGE) to eNB1 (STEP S36). Thereafter, eNB1 sends handover instruction message (RRC CONNECTION RECONFIGURATION) to UE (step S38). In response to the handover instruction message, when UE completes prescribed processing with eNB2, prior to sending handover completion message (RRC CONNECTION RECONFIGURATION COMPLETE), it acquires the position information and the value of reception power (step S40). In the handover completion message (RRC CONNECTION RECONFIGURATION COMPLETE), the position information and the value of reception power acquired at step S40 is included (step S42). With the above-described processing, eNB2 that is the object of radius measurement of cell coverage can obtain the position information and the value of reception power at the completion of handover.

Figure 9:
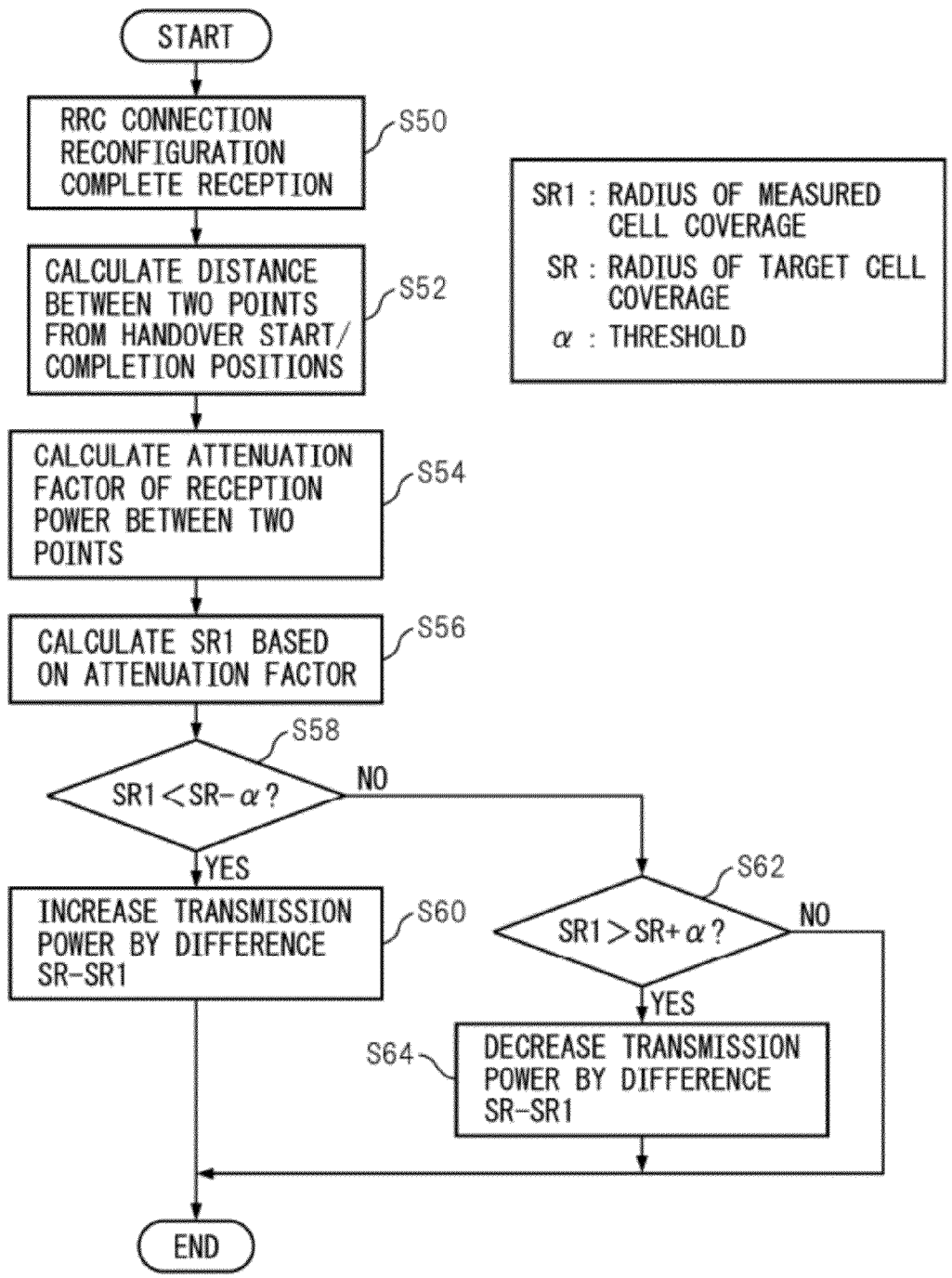
FIG. 9 is a flow chart illustrating the processing of eNB according to second embodiment.

Processing performed in eNB based on the position information and the value of reception power reported to eNB at the start of handover and the position information and the value of reception power reported to eNB at the completion of handover will be described below with reference to FIG. 9. When eNB receives handover completion message (RRC CONNECTION RECONFIGURATION COMPLETE) (step S50), processing at step S52 and thereafter is executed.

Since the position of UE at the start of handover and the position of UE at the completion of handover are known to eNB, eNB calculates the distance D between the two positions in accordance with Hubeny's formula as depicted in Eq. 1 (step S52). The value of reception power of UE at the start of handover and the value of reception power of UE at the completion of handover are known to eNB, and the distance between the two points (distance between the position at the start of handover and the position at the completion of handover) has been calculated at step S52. Therefore, eNB calculates the attenuation factor C of the value of reception power in accordance with Eq. 2 (step S54). Further, eNB calculates the radius SR1 of the measured cell coverage in accordance with Eq. 3 (step S56). Further, eNB preferably determines the shortest distance from eNB to cell edge based on plural position information and values of reception power acquired in the timing of handover from the subordinate plural UEs. By controlling performed based on this shortest distance, cell coverage after controlling securely contains the target cell coverage.

eNB compares the calculated radius SR1 with the radius SR of the target cell coverage, and if SR1 is not included in the permissible range defined by SR, SR−α≤SR1≤SR+α (u: threshold), it adjusts transmission power. Thus, if SR1<SR−α (YES at step S58), which means that the measured cell coverage is excessively narrower than the target cell coverage, eNB controls so as to increase the transmission power (step S60). Also, if SR1>SR+α (YES at step S62), which means that the measured cell coverage is excessively broader than the target cell coverage, eNB controls so as to decrease the transmission power (step S64). Amount of increase or decrease of transmission power at step S60 or step S64 is determined in accordance with the difference between the calculated radius SR1 and the radius SR of the target cell coverage. For example, when the calculated radius SR1 is smaller than the radius SR of the target cell coverage, the amount of increase of transmission power when the difference ΔSR is large is larger than that when the difference ΔSR is small.

As has been described above, in the mobile communication system of the present embodiment, measurement of cell coverage is executed in the timing of handover between eNBs for UE. eNB compares the radius of the measured cell coverage with the radius of the target cell coverage, and transmission power for UE is controlled in accordance with the result of the comparison. Since, in the mobile communication system of the present embodiment, this is executed in the timing of handover between eNBs for UE, measurement of cell boundary can be done at high precision. Therefore, control of transmission power for minimizing the deviation of the measured cell coverage from the target cell coverage can be performed at high precision.

(3) Third Embodiment

The mobile communication system according to the third embodiment will be described below. In the present embodiment as in the second embodiment, the distance from eNB to cell edge (the first distance form eNB to be used as reference of cell coverage) is calculated based on the position information and the value of reception power from UE, and the measured cell coverage in circular shape with this distance from eNB as radius and eNb as the center is presupposed.

(3-1) Outline of Control

In the present embodiment, unlike the second embodiment, if eNB determines based on the report of the value of reception power from UE that UE is positioned near the cell edge, the radius of cell coverage is calculated based on the position information and the value of reception power from UE. Determination of whether or not UE is positioned near the cell edge is based on whether or not the value of the reception power is not greater than a prescribed threshold. In the mobile communication system of the present embodiment, as in the second embodiment, the radius of cell coverage is also measured. The method for measuring (calculating) this radius is described later. eNB compares the radius of the measured cell coverage with the radius of the target cell coverage, and the transmission power to UE is controlled in accordance with the result of comparison. Outline of this control is depicted in FIGS. 10A and 10B.

Figure 10:
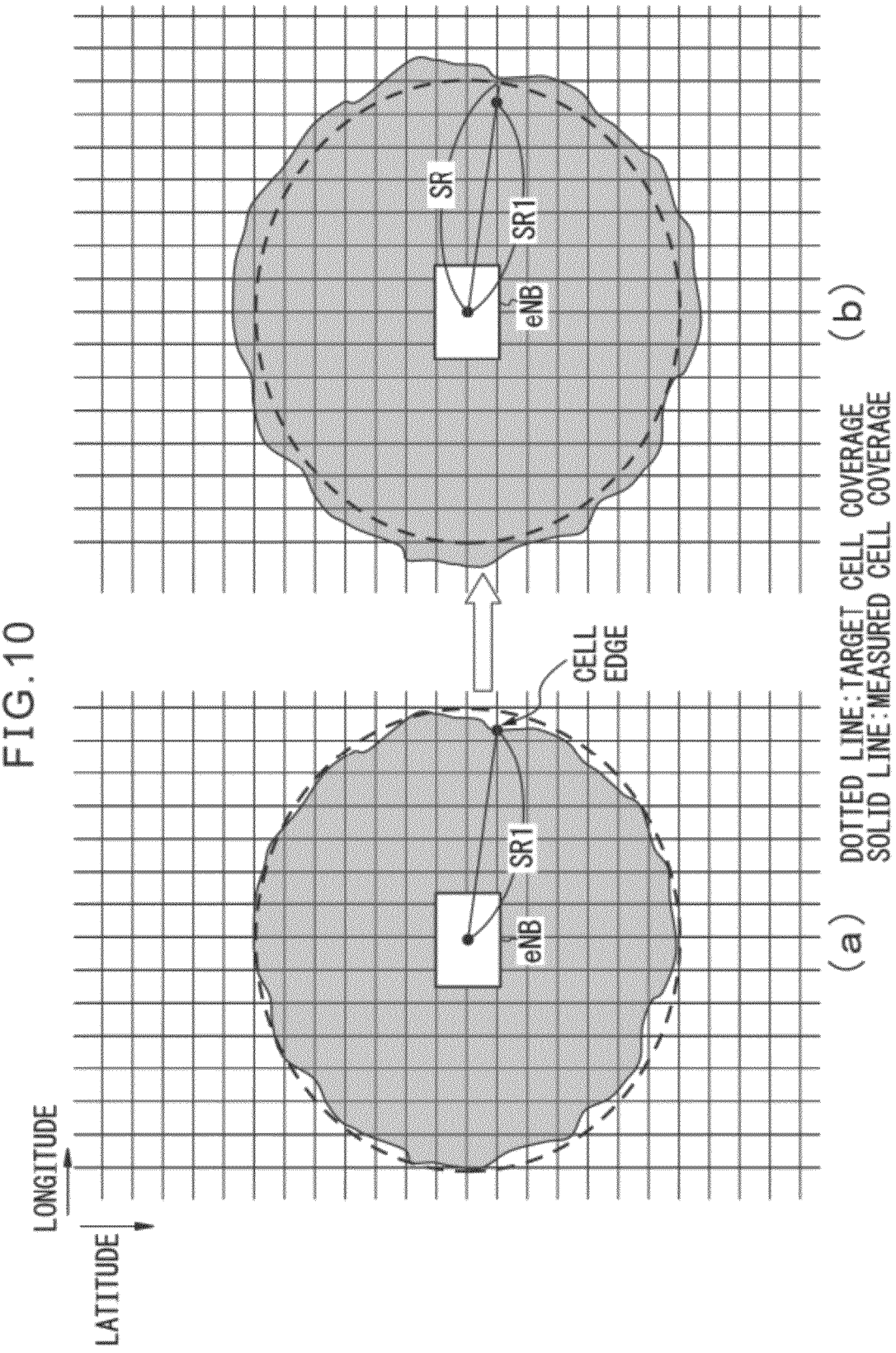
FIG. 10A is a view illustrating the outline of control performed in the third embodiment.
FIG. 10B is a view illustrating the outline of control performed in the third embodiment.

In FIG. 10A depicts cell coverage before control is executed, and FIG. 10B depicts cell coverage after control is executed, respectively. In FIG. 10A, eNB receives from UE the report on the position information and the value of reception power. If this UE is judged to be near the cell edge, the distance from eNB to the cell edge, i.e., the radius of cell coverage (SR1 in FIG. 10A) is calculated. This radius SR1 is the radius of the measured cell coverage. When the radius of the measured cell coverage is not greater than the radius of the target cell coverage, control is performed so as to increase the transmission power from eNB. As a result, as depicted in FIG. 10B, the cell coverage of eNb is enlarged as a whole. It is preferable that eNB obtains the shortest distance from eNB to the cell edge based on the position information and the value of reception power from plural subordinate UEs. By performing control based on this shortest distance, the cell coverage after control securely contains the target cell coverage. In the mobile communication system of the present embodiment, eNB and UE have the same construction as the construction as depicted, for example, in FIG. 6.

(3-2) Method of Calculating the Radius of Cell Coverage

Figure 11:
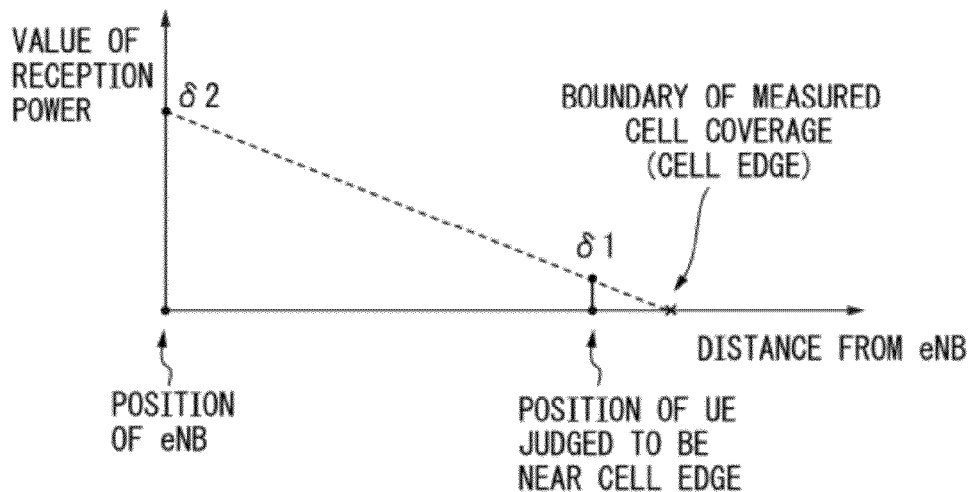
FIG. 11 is a view depicting the relation between the distance of UE situated near the cell edge from eNB and the value of the reception power reported by the eNB in the third embodiment.

For eNB of the present embodiment, method of calculating the radius of cell coverage will be described below with reference to FIG. 11. FIG. 11 is a view depicting the relation between the distance of UE positioned near the cell edge from eNB and the value of reception power reported by the UE. Calculation of the radius of cell coverage is executed by the cell coverage measurement unit 24 (see FIG. 8) of eNB.

eNB receives, from UE judged to be positioned near the cell edge, the report of the position information (the fourth position information) and the value of reception power (the fourth value of reception power). In FIG. 11, this value of reception power is denoted as $\delta 1$. In eNB, it is assumed that a prescribed value of reception power as the value of reception power if UE is positioned at the same position as eNB is known. In FIG. 11, this known value of reception power is denoted as $\delta 2$. This known value of reception power is not limited to the reception power if UE is positioned at the same position as eNB. It is only necessary that the position with reference to eNB (the third position) and the value of reception power (the third value of reception power) are known. For example, the position with reference to eNB and the value of reception power of UE at the position may be measured in advance, and the measured values may be stored in eNB.

As in the second embodiment, eNB measures the cell edge as the boundary of cell coverage as specified latitude and longitude in accordance with trigonometric principle. The distance D between two points is the distance between eNB and UE judged to be positioned near the cell edge. As in the second embodiment, the radius SR1 of the measured cell coverage is calculated in accordance with the Eqs. (1) to (3).

(3-3) Method of Controlling Cell Coverage

Figure 12:
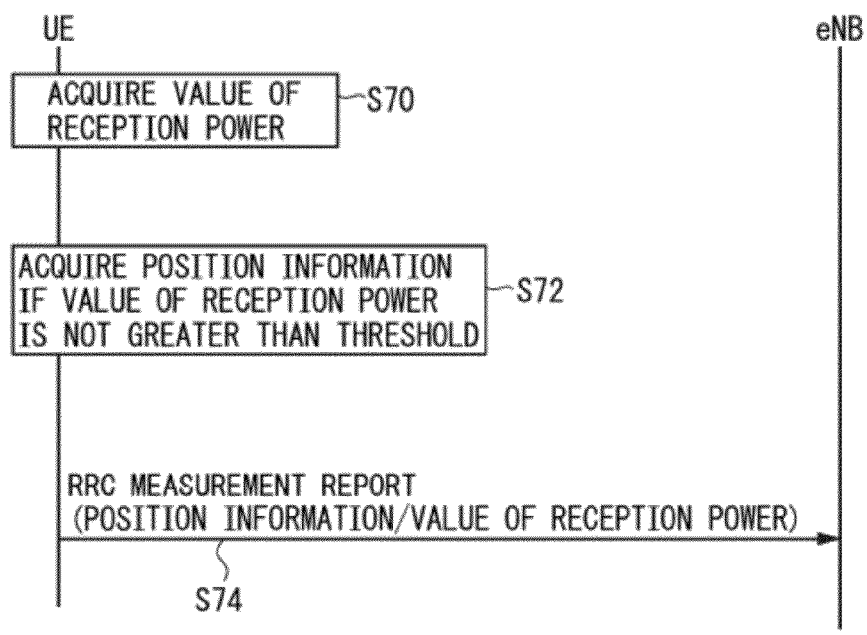
FIG. 12 is a flow chart illustrating the processing performed between eNB and UE in the third embodiment.

Method of controlling cell coverage executed in the mobile communication system of the present embodiment will be described below. First, processing performed between eNB and UE according to the present embodiment will be described with reference to FIG. 12. FIG. 12 is a flow chart depicting the processing performed between eNB and UE according to the present embodiment. First, UE acquires the value of reception power of reference signal from eNB (step S70). Further, if the acquired value of reception power is not greater than a prescribed threshold, UE acquires the position information (step S72). This prescribed threshold is set to determine whether or not the UE is positioned near the cell edge. Then, UE includes the position information and the value of reception power acquired at steps S70 and S72 in the measurement report on the radio communication quality (RRC MEASUREMENT REPORT) to eNB1 (step S74). Thus, eNB obtains the position information and the value of reception power of UE positioned near the cell edge.

Figure 13:
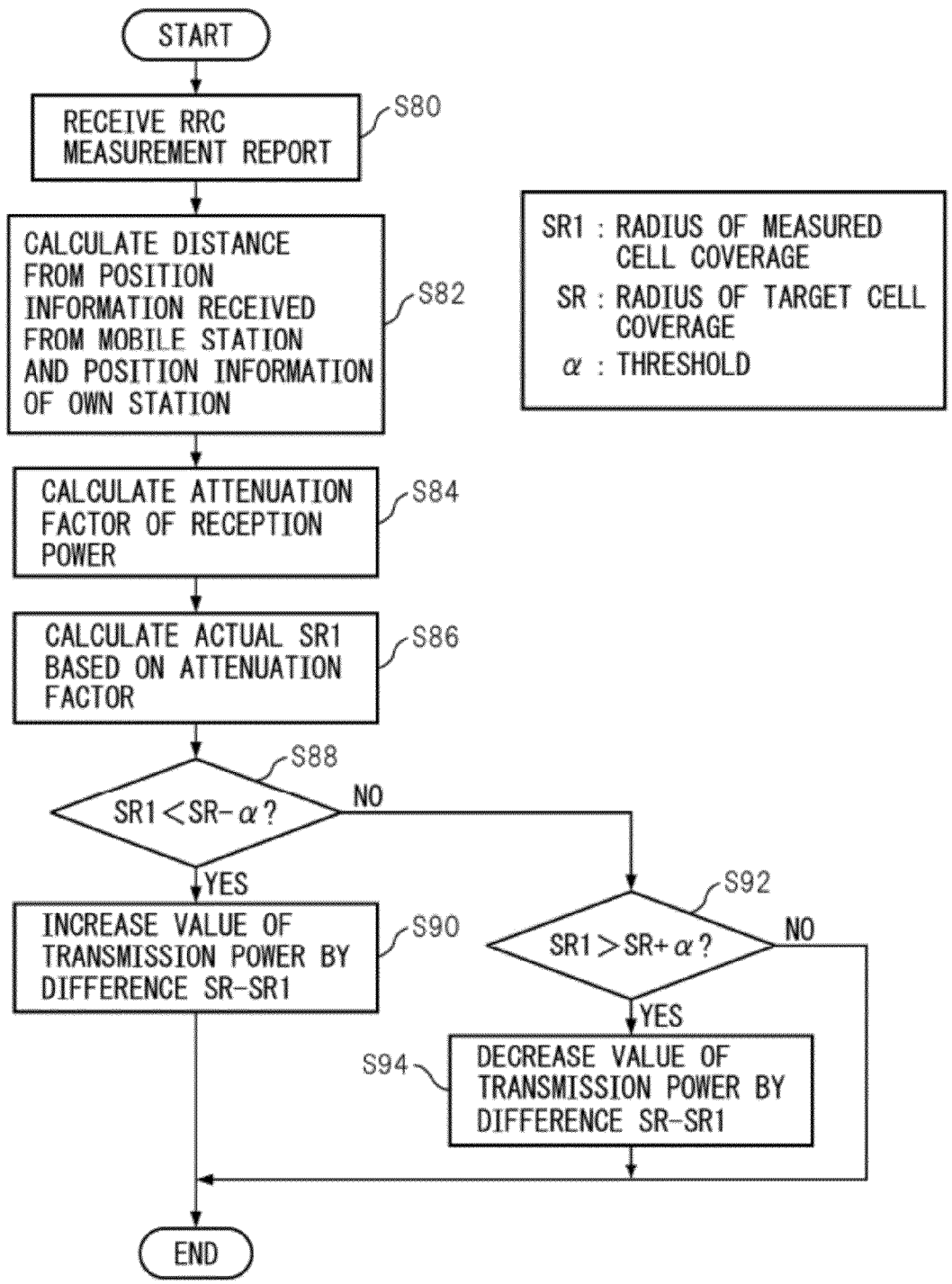
FIG. 13 is a flow chart illustrating the processing of eNB according to third embodiment.

Next, processing performed in eNB based on the position information and the value of reception power of UE positioned near cell edge and the known position information and the value of reception power referring to eNB, will be described below with reference to FIG. 13. In the description that follows, the position information and the value of reception power known in eNB is supposed to be the position information of the eNB and the value of reception power at the position. This processing in eNB is performed at step S74 in FIG. 12 (step S80 in FIG. 13) and at steps thereafter.

After step S80, eNB calculates the distance D between the position of UE positioned near the cell edge and the position of eNB in accordance with the Hubeny's formula as depicted in Eq. 1 (step S82). Then, eNB calculates the attenuation factor C of the value of reception power in accordance with the above Eq. 2 based on the value of reception power of UE positioned near the cell edge and the known value of reception power (step S84). Further, eNB calculates the radius SR1 of the measured cell coverage in accordance with the above Eq. 3 (step S86).

Next, eNB compares the calculated radius SR1 with the radius SR of the target cell coverage, and if SR1 is not included in the permissible range defined by SR as $SR-\alpha \leq SR1 \leq SR+\alpha$ ($\alpha$: threshold), eNB adjusts the transmission power. That is, if $SR1<SR-\alpha$ (YES at step S88), since it means that the measured cell coverage is excessively small as compared to the target cell coverage, eNB controls to increase the transmission power (step S90). Also, if $SR1>SR+\alpha$ (YES at step S92), since it means that the measured cell coverage is excessively large as compared to the target cell coverage, eNB controls to decrease the transmission power (step S94). The amount of increase or decrease of the transmission power at step S90 or S94 is determined in accordance with the difference of the calculated radius SR1 from the radius of the target cell coverage. For example, if the calculated radius SR1 is smaller than the radius SR of the target cell coverage and the difference of two radius is $\Delta SR$, the amount of increase of the transmission power when $\Delta SR$ is large is larger than that when $\Delta SR$ is small.

As has been described above, in the mobile communication system of the present embodiment, measurement of cell coverage is performed when UE is judged to be positioned near the cell edge based on the report of the value of reception power from UE. In order for eNB to obtain the measured cell coverage, the radius of cell coverage is measured. eNB compares the radius of the measured cell coverage with the radius of the target cell coverage, and transmission power to UE is controlled in accordance with the result of the comparison.

(4) Fourth Embodiment

The mobile communication system according to the fourth embodiment will be described below.

(4-1) Outline of Control

In the present embodiment, measurement of cell coverage is performed so as to permit not only cell edge but also local insensitive area in the cell to be specified. To this end, UE measures the attenuation factor of signal from eNB, i.e., path loss, based on the value of transmission power of reference signal from eNB, and the value of reception power of the reference signal. Path loss is, for example, the difference of the value of transmission power of reference signal from eNB and the value of reception power of the reference signal in UE. The larger the path loss, the larger the attenuation factor of a signal from eNB to UE, and the more difficult radio communication between the two becomes. The value of transmission power of reference signal from eNB may be notified to UE by including the value in the downlink control signal from eNB to UE, or may be stored in UE as a known value.

Path loss measured in UE is reported together with the position information from each UE to eNB. This eNB specifies the region of cell coverage by collecting the position information from each UE when the measured path loss is not greater than a prescribed threshold. By collecting the position information and path loss from many UEs, not only cell edge but also local insensitive area in the cell can be specified. Therefore, in the mobile communication system of the present embodiment, not only transmission power, but also height of antenna, direction of antenna and tilt angle, etc., can be selected as parameters to be controlled in order to control to decrease local insensitive area in the cell.

FIG. 14 is a view illustrating the outline of cell coverage control as described above. In FIG. 14, cell coverage in the form of a rectangle or a circle with eNB1 as a center is supposed as an example. This target cell coverage of eNB1 is the region surrounded by dotted line. The region surrounded by solid line is the measured cell coverage obtained by collecting the position information of each UE for which path loss measured by UE is not greater than a prescribed threshold. In the target cell coverage, the region that does not overlap with the measured cell coverage is the insensitive area. In the present embodiment, if eNB1 specifies an insensitive area, eNB1 performs control so as to decrease the insensitive area. In the example depicted in FIG. 14, eNB1 may, for example, increase transmission power in order to decrease insensitive area, or may adjust tilt angle of the antenna of eNB1 in order to decrease insensitive area. By adjusting a tilt angle of the antenna of eNB1, the measured cell coverage is shifted as a whole so as to bring the measured cell coverage coincident to the target cell coverage.

Which of the plurality of parameters including transmission power, tilt angle of antenna, etc., is to be controlled is decided based on the result of specifying insensitive area. As an example, if there is an insensitive area in all directions near the cell edge, transmission power may be selected as the parameter to be controlled. As another example, if insensitive area exists locally or in a specific direction, tilt angle of antenna may be selected as the parameter to be controlled. In the latter case, a specific sector may be selected to be controlled.

In eNB of the present embodiment, a control system (not depicted) for controlling height, direction and tilt angle of antenna is provided. In this control system, actuators for adjusting height of antenna, orientation of antenna, and tilt angle of antenna, etc., in accordance with control command are included.

(4-2) Method of Controlling Cell Coverage

Next, method of controlling cell coverage executed in the mobile communication system of the present embodiment will be described. FIG. 15 is a flow chart depicting the processing between eNB and UE executed in accordance with the method of controlling cell coverage of the present embodiment.

In FIG. 15, first, eNB transmits reference signal at a prescribed power level to UE (step S98). UE acquires the value of reception power of the reference signal from eNB. The value of transmission power of the reference signal of eNB is supposed to be known to UE. Based on the value of transmission power of the reference signal of eNB and the value of reception power of the reference signal in UE, UE measures the path loss (step S100). Further, UE acquires the position information (step S102). The position information includes, for example, the value of latitude and longitude in prescribed area unit (region unit). Then, UE includes the path loss and the position information acquired at steps S100 and S102 in the measurement report of radio communication quality (RRC MEASUREMENT REPORT) to eNB1 (step S104). Thus, eNB can obtain the position information and the value of reception power of UE.

eNB performs the processing at steps S100 to S104 for each of a plurality of UEs performing radio communication with eNB to thereby record the position information in prescribed area unit in correlation with the path loss (step S106). Then, mapping data are generated based on table data in which sufficient number of the position information and the path loss are correlated for specifying the region of cell coverage (step S108). The mapping data are, for example, data in which the values of path loss are plotted in two-dimensional map of latitude and longitude. Plural values of path loss are statistically processed such as averaging. The region where path loss is equal to or greater than a prescribed threshold is specified as insensitive area since attenuation factor of signal from eNB to UE is large (step S110). The region where path loss is less than the prescribed threshold is specified as sensitive area since attenuation factor of signal from eNB to UE is small. The measured cell coverage is obtained by thus specifying insensitive area and sensitive area. Further, control is performed so as to minimize the deviation of the measured cell coverage from the target cell coverage (step S112). Specifically, at least one of plural parameters such as transmission power, height of antenna, orientation of antenna, and tilt angle, etc., is controlled.

As has been described above, in the mobile communication system of the present embodiment, each UE measures path loss between eNB and UE, and eNB specifies the region of the measured cell coverage in prescribed area unit by correlating the position information and path loss for each UE. As a result, the insensitive area is specified as the deviation of the measured cell coverage from the target cell coverage. eNB controls at least one of a plurality parameters such as transmission power, height of antenna, orientation of antenna and tilt angle, etc., so as to decrease the specified insensitive area. Thus, not only cell edge, but also the local insensitive area in the cell is specified, so that an optimum parameter to be controlled can be selected from plural parameters.

(5) Fifth Embodiment

The mobile communication system of the fifth embodiment will be described below.

(5-1) Outline of Control

In the fourth embodiment, insensitive area is specified for single eNB, but the insensitive area may be covered by adjacent eNB. In that case, when each of plural eNBs belonging to a fixed service area performs control so as to decrease insensitive area, the result of control may become excessive. For example, if all eNBs belonging to a fixed service area performs control so as to increase transmission power, cell coverage of these eNBs excessively overlap and this is not desirable from the view point of power consumption and/or radio resource. Therefore, in the mobile communication system of the present embodiment, information collected from UE with plural eNBs belonging to a fixed service area is summarized in single eNB in the service area, and the single eNB determines the content of control of each eNB in the service area.

FIG. 16 is a view illustrating the outline of cell coverage control as described above. In FIG. 16, as in FIG. 14, cell coverage in the form of a rectangle or a circle with eNB as the center is supposed as an example. In FIG. 16, the case where there are plural eNB1, eNB2, eNB3, for example, in a fixed service area is depicted. A region enclosed by dotted line with each eNB as a center represents a target cell coverage for the eNB. A region enclosed by solid line with each eNB as a center represents a measured cell coverage obtained by collecting position information of each UE when the path loss measured by the UE is not greater than a prescribed threshold. In the target cell coverage, the region not overlapping with the measured cell coverage is insensitive area. Each eNB collects the position information and path loss from UE as in the fourth embodiment. In the present embodiment, however, table data correlating the position information and path loss for each eNB are summarized in a master eNB. In the present embodiment, a slave eNB is eNB that provides table data to the master eNB. In FIG. 16, for example, eNB3 is the master eNB, and eNB1 and eNB2 are slave eNBs. Communication between the master eNB and the slave eNB utilizes a prescribed control protocol, for example, X2AP (X2 Application Protocol) in LTE.

(5-2) Method of Controlling Cell Coverage

Method of controlling cell coverage in the mobile communication system of the present embodiment will be described below. FIG. 17 is a flow chart depicting the processing executed between each eNB and each UE in accordance with the method of controlling cell coverage of the present embodiment. In FIG. 17, as in FIG. 16, UE1, UE2, and UE3 respectively communicate with eNB1, eNB2 and eNB3.

Although not depicted in the flow chart of FIG. 17, UE1, UE2, and UE3 respectively measure path loss based on reference signal from eNB1, eNB2 and eNB3, and acquire the position information as at steps S98 to S102 in FIG. 15. Thereafter, UE1, UE2, and UE3 respectively include the path loss and the position information in the measurement report on radio communication quality (RRC MEASUREMENT REPORT) (step S120a, S120b, S120c). Each eNB sequentially records the path loss and the position information from each UE (step S122a, S122b, S122c).

After generating table data in which sufficient number of the position information and the path loss are correlated for specifying the region of cell coverage (step S124a, S124b, S124c), the slave eNB (eNB1, eNB2) transmit the table data to the master eNB (eNB3) (step S126a, S126b, S126c). This transmission is performed, for example, by including the table data in a new message of X2AP. Upon receiving the table data, eNB3 generates mapping data and specify insensitive area (step S128). In the mapping data, the region in which path loss is equal to or greater than a prescribed threshold has large attenuation factor of signal from eNB to UE, and is specified as the insensitive area.

eNB3 summarizes table data of eNB1, eNB2 and eNB3, and specifies a region in which path loss in all eNBs is equal to or greater than a prescribed threshold as insensitive area. A region in which path loss is less than the prescribed threshold in table data generated in one of eNBs is specified as sensitive area since it is covered by at least one eNB.

By specifying the insensitive area and sensitive area in this way, the measured cell coverage is obtained in eNB3. Then, control is performed so as to minimize the deviation of the measured cell coverage from the target cell coverage (step S130). At this time, depending on the position of the insensitive area, if it is determined that control is preferably performed by eNB1 and/or eNB2, control command is transmitted from eNB3 to eNB1 and/or eNB2 using prescribed control protocol such as X2AP, etc. (step S132a, S132b). As a result, control of at least one of a plurality of parameters such as transmission power, height of antenna, orientation of antenna direction, and tilt angle, is performed in any of eNB1 to eNB3 so as to resolve insensitive area.

As has been described above, in the mobile communication system of the present embodiment, the position information and the information on path loss are summarized in a master eNB among plural eNBs belonging to a fixed service area, and the master eNB determines the content of control to be performed. At this time, the master eNB specifies a region in which path loss is not less than a prescribed threshold in all eNBs in the service area as insensitive area, and issues control command to each eNB such that there is no overlapping of an area to be controlled by each eNB. Thus, in a fixed service area, overall result of control of cell coverage is prevented from becoming excessive.

(6) Sixth Embodiment

The mobile communication system of the sixth embodiment will be described below.

(6-1) Outline of Control

The mobile communication system of the sixth embodiment is constructed, as in the fifth embodiment, such that control of cell coverage by plural eNBs belonging to a fixed service area is prevented from becoming excessive. Specifically, an entity such as EMS (Element Management System) is provided to summarize information from plural eNBs in a fixed service area and to determine the content of control to be executed by each eNB. EMS is a monitoring control apparatus for monitoring plural eNBs FIG. 18 is a view illustrating the outline of the above-described control. FIG. 18 differs from FIG. 16 in that each eNB in the service area is connected to EMS. In the present embodiment, each eNB collects the position information and path loss from UE as in the fourth and fifth embodiments, but table data including the position information and path loss of each eNB are summarized by EMS. EMS determines the content of control to be performed by each eNB based on the summarized table data.

(6-2) Method of Controlling Cell Coverage

Next, method of controlling cell coverage in the mobile communication system of the present embodiment will be described below. FIG. 19 is a flow chart depicting the processing executed between each eNB, each UE, and EMS in accordance with the method of controlling cell coverage of the present embodiment. In FIG. 19, as in FIG. 18, UE1, UE2, and UE3 respectively communicate with eNB1, eNB2 and eNB3.

Although not depicted in the flow chart of FIG. 19, UE1, UE2, and UE3 respectively measure path loss based on reference signal from eNB1, eNB2 and eNB3, and acquire the position information as at steps S98 to S102 in FIG. 15. Thereafter, UE1, UE2, and UE3 respectively include the path loss and the position information in the measurement report on radio communication quality (RRC MEASUREMENT REPORT) (step S140a, S140b, S140c). Each eNB sequentially records the path loss and the position information from each UE and transfer it to EMS (step S142a, S1422b, S142c).

After sufficient number of the position information and the path loss are collected, EMS generates mapping data, and specifies the insensitive area (step S144). In the mapping data, the region in which path loss is equal to or greater than a prescribed threshold has large attenuation factor of signal from eNB to UE, and is specifies as insensitive area.

EMS summarizes table data of eNB1, eNB2 and eNB3, and specifies a region in which path loss in all eNBs is equal to or greater than a prescribed threshold as the insensitive area. A region in which path loss is less than the prescribed threshold in table data generated in one of eNBs is specified as the sensitive area since it is covered by at least one eNB.

By specifying the insensitive area and sensitive area in this way, the measured cell coverage is obtained in eNB3. Then, EMS determines the content of control so as to minimize the deviation of the measured cell coverage from the target cell coverage, and sends control command to each eNB (step S146). As a result, control of at least one of a plurality of parameters such as transmission power, height of antenna, orientation of antenna direction, and tilt angle, is performed in at least one of eNB1 to eNB3 so as to resolve insensitive area (step S148a, S148b, S148c).

In the mobile communication system of the present embodiment, as in the fifth embodiment, in a fixed service area, overall result of control of cell coverage is also prevented from becoming excessive.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A mobile communication system comprising a base station and mobile stations:
    wherein a mobile station reports to the base station position information of the mobile station and a value of reception power of a reference signal from the base station; and
    wherein the base station estimates a first distance from the base station as a reference of cell coverage based on the position information and the value of reception power reported from the mobile station, and controls transmission power to the mobile station so as to minimize deviation of the first distance from a prescribed target distance.

2. The mobile communication system according to claim 1, wherein the base station estimates the first distance based on a first position and a first value of reception power of the reference signal at a time of handover start of the mobile station and a second position and a second value of reception power of the reference signal at a time of handover completion of the mobile station.

3. The mobile communication system according to claim 1, wherein the base station estimates the first distance based on a known third position and a known third value of reception power and a fourth position and a fourth value of reception power of the reference signal of a mobile station judged to be positioned near cell edge.

4. The mobile communication system according to claim 1, wherein the base station selects the shortest first distance from among plural first distances obtained based on the position information and the value of reception power from plural mobile stations.

5. A mobile communication system comprising a base station and mobile stations:
    wherein a mobile station reports to the base station position information of the mobile station and a value of reception power of a reference signal from the base station; and
    wherein the base station obtains a measured cell coverage as a result of measurement of cell coverage based on the position information and the value of reception power reported from the mobile station, and controls at least one of plural parameters including transmission power to the mobile station, tilt angle of antenna, so as to minimize deviation of the measured cell coverage from a target cell coverage,
    wherein the base station specifies a region of the measured cell coverage in prescribed region unit by correlating signal attenuation factor obtained from the value of transmission power of the reference signal and the value of reception power of the reference signal in the mobile station with a position of the mobile station.

6. A base station comprising:
    a transmission unit that transmits a reference signal to mobile stations;
    a reception unit that obtains position information of a mobile station and a value of reception power of the reference signal in the mobile station from the mobile station;
    a cell coverage measurement unit that estimates a first distance from the base station as reference of cell coverage based on the position information and the value of reception power from the mobile station; and
    a cell coverage control unit that controls transmission power to the mobile station so as to minimize deviation of the first distance from a prescribed target distance.

7. The base station according to claim 6, wherein the cell coverage measurement unit estimates the first distance based on a first position and a first value of reception power of the reference signal at a time of handover start of the mobile station and a second position and a second value of reception power of the reference signal at a time of handover completion of the mobile station.

8. The base station according to claim 6, wherein the cell coverage measurement unit estimates the first distance based on a known third position and a known third value of reception power and a fourth position and a fourth value of reception power of the reference signal of a mobile station judged to be positioned near cell edge.

9. The base station according to claim 6, wherein the cell coverage measurement unit selects the shortest first distance from among plural first distances obtained based on the position information and the value of reception power from a plurality of mobile stations.

10. A base station comprising:
    a transmission unit that transmits a reference signal to mobile stations;
    a reception unit that obtains position information of a mobile station and a value of reception power of the reference signal in the mobile station from the mobile station;
    a cell coverage measurement unit that obtains measured cell coverage as a result of measurement of cell coverage based on the position information and the value of reception power from the mobile station; and
    a cell coverage control unit that controls at least one of plural parameters including transmission power to the mobile station, tilt angle of antenna so as to minimize deviation of the measured cell coverage from a target cell coverage,
    wherein the cell coverage measurement unit specifies a region of the measured cell coverage in prescribed region unit by correlating signal attenuation factor obtained from the value of transmission power of the reference signal and the value of reception power of the reference signal in the mobile station with a position of the mobile station.

11. A control method of controlling cell coverage for a base station to control cell coverage of the base station in a mobile communication system including the base station and mobile stations, the control method of controlling cell coverage comprising:

reporting to the base station by a mobile station position information of the mobile station and a value of reception power of a reference signal from the base station;

estimating by the base station a first distance from the base station as a reference of cell coverage based on the position information and the value of reception power from the mobile station; and controlling by the base station transmission power to the mobile station, so as to minimize deviation of the first distance from a prescribed target distance.

12. The control method of controlling cell coverage according to claim 11, wherein the estimating by the base station includes estimating the first distance based on a first position and a first value of reception power of the reference signal at a time of handover start of the mobile station and a second position and a second value of reception power of the reference signal at a time of handover completion of the mobile station.

13. The control method of controlling cell coverage according to claim 11, wherein the estimating by the base station includes estimating the first distance based on a known third position and a known third value of reception power and a fourth position and a fourth value of reception power of the reference signal of a mobile station judged to be positioned near cell edge.

14. The control method of controlling cell coverage according to claim 11, further including selecting by the base station the shortest first distance from among plural first distances obtained based on the position information and the value of reception power from a plurality of mobile stations.

15. A control method of controlling cell coverage for a base station to control cell coverage of the base station in a mobile communication system including the base station and mobile stations, the control method of controlling cell coverage comprising:

reporting to the base station by a mobile station position information of the mobile station and a value of reception power of a reference signal from the base station;

obtaining by the base station measured cell coverage as a result of measurement of cell coverage based on the position information and the value of reception power from the mobile station; and controlling by the base station at least one of a plurality of parameters including transmission power to the mobile station, tilt angle of antenna so as to minimize deviation of the measured cell coverage from a target cell coverage, wherein the obtaining by the base station of the measured cell coverage includes specifying by the base station a region of the measured cell coverage in prescribed region unit by correlating signal attenuation factor obtained from the value of transmission power of the reference signal and the value of reception power of the reference signal in the mobile station with a position of the mobile station.

16. The mobile communication system according to claim 1, wherein the base station controls a tilt angle of antenna so as to minimize the deviation of the first distance from a prescribed target distance.

17. The base station according to claim 6, wherein the cell coverage control unit controls a tilt angle of antenna so as to minimize the deviation of the first distance from the prescribed target distance.

18. The control method of controlling cell coverage according to claim 11, wherein the controlling by the base station comprises controlling by the base station a tilt angle of antenna so as to minimize the deviation of the first distance from the prescribed target distance.

* * * * *